(12) United States Patent
Murakami

(10) Patent No.: US 11,486,703 B2
(45) Date of Patent: Nov. 1, 2022

(54) MEASURING APPARATUS AND MEASURING METHOD

(71) Applicant: OLYMPUS CORPORATION, Tokyo (JP)

(72) Inventor: Miyuki Murakami, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 1074 days.

(21) Appl. No.: 16/139,275

(22) Filed: Sep. 24, 2018

(65) Prior Publication Data

US 2019/0033070 A1   Jan. 31, 2019

Related U.S. Application Data

(63) Continuation of application No. PCT/JP2017/010149, filed on Mar. 14, 2017.

(30) Foreign Application Priority Data

Mar. 28, 2016 (JP) .............................. JP2016-064725

(51) Int. Cl.
*G01C 3/06* (2006.01)
*G01N 21/49* (2006.01)
(Continued)

(52) U.S. Cl.
CPC ................ *G01C 3/06* (2013.01); *G01N 21/27* (2013.01); *G01N 21/49* (2013.01); *G01S 17/00* (2013.01);
(Continued)

(58) Field of Classification Search
CPC .......... G01C 3/06; G01N 21/27; G01N 21/49; G01N 2021/4709; G01S 17/00; G01S 17/36; G01S 17/89
(Continued)

(56) References Cited

U.S. PATENT DOCUMENTS 4,963,024 A   10/1990   Ulich
6,104,946 A   8/2000    Tsuchiya et al.
(Continued)

FOREIGN PATENT DOCUMENTS

JP   H03501652 A     4/1991
JP   H0833355 B2  *  3/1996
(Continued)

OTHER PUBLICATIONS

International Search Report dated May 30, 2017 issued in PCT/JP2017/010149.

*Primary Examiner* — Tarifur R Chowdhury
*Assistant Examiner* — Omar H Nixon
(74) *Attorney, Agent, or Firm* — Scully, Scott, Murphy & Presser, P.C.

(57) ABSTRACT

A measuring apparatus includes: a light source device that projects light or light of which intensity is periodically modulated onto a measurement object; a light receiver that receives backscattered light of light projected by the light source device from the measurement object; and a processor comprising hardware, the processor being configured to: measure TOF information of the light projected by the light source device and the backscattered light received by the light receiver; acquire distances from a surface of the measurement object to the light source device and the light receiver; and calculate an internal propagation distance in the measurement object according to the measured TOF information and the acquired distances.

33 Claims, 27 Drawing Sheets

(51) Int. Cl.
    *G01S 17/00*    (2020.01)
    *G01S 17/89*    (2020.01)
    *G01S 17/36*    (2006.01)
    *G01N 21/27*    (2006.01)
    *G01N 21/47*    (2006.01)

(52) U.S. Cl.
    CPC .............. *G01S 17/36* (2013.01); *G01S 17/89* (2013.01); *G01N 2021/4709* (2013.01)

(58) Field of Classification Search
    USPC ....................................................... 356/4.01
    See application file for complete search history.

(56) References Cited

U.S. PATENT DOCUMENTS

| | | | |
|---|---|---|---|
| 8,659,039 B2* | 2/2014 | Wang | H01L 33/24 257/94 |
| 9,307,910 B2* | 4/2016 | Kamimura | A61B 1/0661 |
| 2009/0079993 A1* | 3/2009 | Yatagai | A61B 5/7257 356/497 |
| 2014/0028805 A1* | 1/2014 | Tohme | G01B 11/2518 348/47 |
| 2014/0218684 A1* | 8/2014 | Kumar | A61B 3/0025 351/246 |
| 2015/0051496 A1 | 2/2015 | Ouchi | |
| 2015/0160651 A1* | 6/2015 | Tateno | G05B 19/406 700/110 |
| 2015/0213342 A1* | 7/2015 | Fukamachi | H04N 1/6097 358/1.9 |
| 2016/0183805 A1* | 6/2016 | Kobayashi | A61B 1/00057 356/243.1 |
| 2016/0373669 A1* | 12/2016 | Ando | A61B 5/4064 |
| 2018/0011174 A1* | 1/2018 | Miles | G01J 1/44 |

FOREIGN PATENT DOCUMENTS

| | | |
|---|---|---|
| JP | H08254497 A | 10/1996 |
| JP | H10111238 A | 4/1998 |
| JP | H11287755 A | 10/1999 |
| JP | 2000292133 A | * 10/2000 |
| JP | 2004333344 A | 11/2004 |
| JP | 2010210506 A | 9/2010 |
| JP | 2013190350 A | 9/2013 |

* cited by examiner

ILLUMINATION SIDE LIGHT RECEIVING SIDE

MEASURING APPARATUS AND MEASURING METHOD

CROSS-REFERENCE TO RELATED APPLICATION

This application is a continuation of PCT International Application No. PCT/JP2017/010149 filed on Mar. 14, 2017 which claims the benefit of priority from Japanese Patent Application No. 2016-064725 filed on Mar. 28, 2016, the entire contents of which are incorporated herein by reference.

BACKGROUND

1. Technical Field

The present disclosure relates to a measuring apparatus and a measuring method.

2. Related Art

In the related art, there is known a measuring apparatus that projects light from a light source such as a microscope or an endoscope and measures a subject. JP 8-254497 A and JP 11-287755 A disclose measuring apparatuses that allows a light source device and a light receiver to be brought into contact with a measurement object and measures an inside of the subject. In these measuring apparatuses, time of flight (TOF) measurement is used, and there are known a method of periodically modulating intensity of light projected from a light source and measuring a distance of propagation of light inside of a measurement object from a phase shift of intensity modulation between the light projected and light returning from the subject and a method of measuring a light propagation distance from a time delay until a short pulse is projected from the light source and light returning from the subject is received.

SUMMARY

In some embodiments, a measuring apparatus includes: a light source device that is arranged with respect to a measurement object with a gas layer or a vacuum layer interposed between the light source device and the measurement object and that projects pulsed light or light of which intensity is periodically modulated onto the measurement object; a light receiver that is arranged with respect to the measurement object with the gas layer or the vacuum layer interposed between the light source device and the measurement object and that receives backscattered light of light projected by the light source device from the measurement object; and a processor comprising hardware, the processor being configured to: measure TOF information of the light projected by the light source device and the backscattered light received by the light receiver; acquire distances from a surface of the measurement object to the light source device and the light receiver; and calculate an internal propagation distance in the measurement object according to the measured TOF information and the acquired distances.

In some embodiments, provided is a measuring method using a measuring apparatus in which a light source device and a light receiver are arranged with respect to a measurement object with a gas layer or a vacuum layer interposed between the light source device and the measurement object and which projects pulsed light or light of which intensity is periodically modulated onto the measurement object and receives backscattered light of light projected by the light source device from the measurement object. The measuring method includes: measuring TOF information of the light projected by the light source device and the backscattered light received by the light receiver; acquiring distances, based on the TOF information, from a surface of the measurement object and an inside of the measurement object to the light source device and the light receiver, respectively; and calculating an internal propagation distance in the measurement object according to the measured TOF information and the acquired distances.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
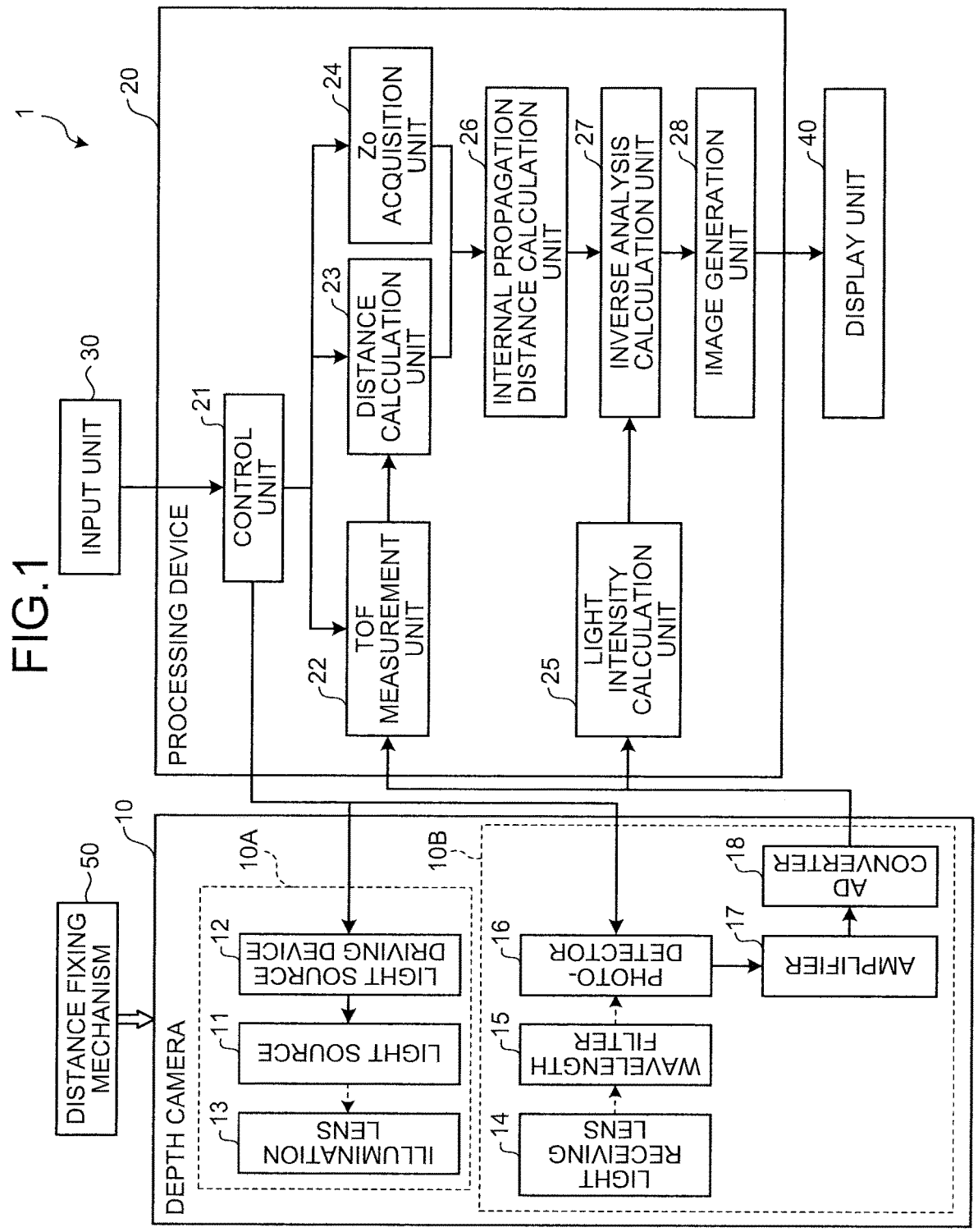
FIG. 1 is a schematic diagram illustrating a configuration of a measuring apparatus according to a first embodiment.

Hereinafter, embodiments of a measuring apparatus and a measuring method according to the disclosure will be described with reference to the drawings. In addition, the disclosure is not limited by these embodiments. The disclosure can be generally applied to measuring apparatuses and measuring methods.

In addition, in the description of the drawings, the same or corresponding elements are appropriately denoted by the same reference numeral. In addition, it should be noted that the drawings are schematic and that a relationship of dimensions of each element, a ratio of each element, and the like may differ from the reality in some cases. A portion of which the relationship of dimensions and ratios are different may also be included in the different drawings.

First Embodiment

FIG. 1 is a schematic diagram illustrating a configuration of a measuring apparatus according to a first embodiment. As illustrated in FIG. 1, a measuring apparatus 1 according to the first embodiment includes a depth camera 10 that projects light onto a measurement object and receives backscattered light from the measurement object, a processing device 20 that processes a signal acquired by the depth camera 10, an input unit 30 that receives various inputs from a user, a display unit 40 that displays an image generated by the processing device 20, and a distance fixing mechanism 50 that fixes a distance between the depth camera 10 and the measurement object.

Figure 2:
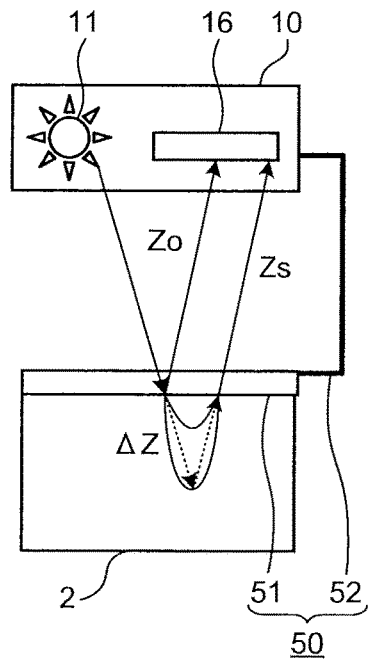
FIG. 2 is a diagram illustrating a state where a measurement object is measured by the measuring apparatus illustrated in FIG. 1.

FIG. 2 is a diagram illustrating a state where the measurement object is measured by the measuring apparatus illustrated in FIG. 1. As illustrated in FIG. 2, the depth camera 10 is arranged with respect to the measurement object 2 with an air layer interposed therebetween. The reference distance Zo, which is the separation distance between the surface of the measurement object 2 and the depth camera 10, is fixed by the distance fixing mechanism 50. The flight distance Zs is half of the distance that the light projected from the depth camera 10 flies before being scattered back inside the measurement object 2 and being incident on the depth camera 10. In addition, in FIG. 2, angles given to light projected from a light source 11 and light incident on a photodetector 16 are illustrated. However, this path is one extracted from a plurality of paths of illumination light in order to explain the path through which the light flies. In addition, the light source 11 and the photodetector 16 may be arranged so that the optical axis of the light projected from the light source 11 and the optical axis of the light incident on the photodetector 16 are arranged actually with angles given with respect to the measurement object 2. However, the light source 11 and the photodetector 16 may be arranged so that the optical axes are coaxial with the measurement object 2. Hereinafter, the same applies to each embodiment in this specification.

The depth camera 10 includes a light source device 10A that projects light of which intensity is periodically modulating onto the measurement object 2 and a light receiver 10B that receives the backscattered light of the projected light from the measurement object 2.

The light source device 10A includes a light source 11 that projects light onto the measurement object 2, a light source driving device 12 that drives and controls the light source 11, and an illumination lens 13 that illuminates a predetermined range of the measurement object 2 with the light projected by the light source 11.

The light source 11 is, for example, a light emitting diode (LED) and emits light having a wavelength of $_{850}$ nm. The light source 11 emits light of which light intensity is modulated so as to be a sinusoidal wave of 30 MHz under the control by the light source driving device 12. However, the intensity modulation of the light projected from the light source 11 may be a pulse or a rectangular wave. In addition, the wavelength of the light projected from the light source 11 is not particularly limited. The wavelength may be variable, or the light may be light with a wide wavelength band.

The illumination lens 13 is, for example, a diffusion lens with a high NA (for example, an opening angle of 90° on both sides) that diffuses the light projected from the light source 11.

The light receiver 10B includes a light receiving lens 14 that condenses the backscattered light from the measurement object 2, a wavelength filter 15 that transmits only light having a predetermined wavelength, a photodetector 16 that detects the light transmitted through the wavelength filter 15, an amplifier 17 that amplifies the signal output from the photodetector 16, and an AD converter 18 that AD-converts the signal amplified by the amplifier 17.

The light receiving lens 14 is, for example, a condenser lens with a high NA (for example, an opening angle of 90° on both sides) that condenses the backscattered light from the measurement object 2.

The wavelength filter 15 is, for example, a band pass filter that selectively transmits only light having a wavelength in the vicinity of 850 nm. The wavelength filter 15 transmits only backscattered light from the measurement object 2 and prevents stray light having other wavelengths from being incident on the photodetector 16.

The photodetector 16 is a complementary metal oxide semiconductor (CMOS) type TOF sensor chip. The photodetector 16 converts the received light into an electric signal by photoelectric conversion. However, the photodetector 16 may be a charge coupled device (CCD) type TOF sensor chip.

The amplifier 17 amplifies and outputs the electric signal output from the photodetector 16. The AD converter 18 converts (AD-converts) the electric signal which is an analog signal amplified by the amplifier 17 into a digital signal and outputs the digital signal.

The processing device 20 includes a control unit 21, a TOF measurement unit 22, a distance calculation unit 23, a Zo acquisition unit 24, a light intensity calculation unit 25, an internal propagation distance calculation unit 26, an inverse analysis calculation unit 27 as a calculation unit, and an image generation unit 28.

The control unit 21 is realized by using a central processing unit (CPU) or the like. The control unit 21 controls the processing operation of each unit of the processing device 20. The control unit 21 controls the operations of the processing device 20 by transferring instruction information and data for each configuration of the processing device 20. In addition, the control unit 21 performs control so that the operations of the light source 11 and the photodetector 16 are synchronized.

The TOF measurement unit 22 measures the phase shift of the intensity modulation between the light projected from the light source 11 and the light received by the photodetector 16 as the TOF information. Specifically, the control unit 21 acquires the phase of the light projected by the light source device 10A, acquires the phase of the light received from the AD converter 18 by the light receiver 10B, compares the acquired phases, and calculates the phase shift $\phi$.

Under the control of the control unit 21, the distance calculation unit 23 calculates the distance (flight distance Zs in FIG. 2) of propagation of the light that is projected from the light source device 10A and reaches the light receiver 10B, from the phase shift $\phi$ calculated by the TOF measurement unit 22. When the frequency of intensity modulation is denoted by fm and the speed of light is denoted by c, the flight distance Zs can be calculated by the following equation (1) using the phase shift $\phi$.

$$Zs = \frac{\varphi c}{4\pi fm} \quad (1)$$

The Zo acquisition unit 24 acquires the distance (reference distance Zo in FIG. 2) from the surface of the measurement object 2 to the light source device 10A and the light receiver 10B. Specifically, since the distance from the surface of the measurement object 2 to the light source device 10A and the light receiver 10B is fixed to the reference distance Zo by the distance fixing mechanism 50, the reference distance Zo is acquired from the control unit 21. The Zo acquisition unit 24 may acquire the reference distance Zo by various methods capable of measuring the distance in a non-contact manner, such as an AF function (contrast AF, image plane phase difference AF) of a digital camera.

The light intensity calculation unit 25 calculates the light intensity from the electric signal acquired from the AD converter 18. The light intensity A received by the photodetector 16 can be calculated by the following equation (2) when A0, A1, A2, and A3 are set as luminance values of pixels of the TOF sensor chip at 0°, 90°, 180°, and 270°, respectively.

$$A = \frac{\sqrt{(A0-A2)^2 + (A1-A3)^2}}{2} \quad (2)$$

The internal propagation distance calculation unit 26 calculates the internal propagation distance $\Delta Z$ in the measurement object 2 according to the reference distance Zo acquired by the Zo acquisition unit 24 and the flight distance Zs calculated by the distance calculation unit 23. Specifically, the internal propagation distance $\Delta Z$ can be calculated by the following equation (3).

$$\Delta z = 2 \times (Zs - Zo) \quad (3)$$

The inverse analysis calculation unit 27 calculates optical characteristics such as a scattering coefficient, an absorption coefficient, and an anisotropic parameter of the measurement object 2 by inverse analysis according to the internal propagation distance $\Delta Z$ calculated by the internal propagation distance calculation unit 26 and the light intensity A calculated by the light intensity calculation unit 25.

The image generation unit 28 generates and outputs an image signal on the basis of the optical characteristics obtained by the inverse analysis calculation unit 27 through calculation. Specifically, the image generation unit 28 generates an image signal in which shading, color, contrast, and the like are changed according to the values of the optical characteristics of each pixel obtained by the inverse analysis calculation unit 27 through calculation. The image generation unit 28 may generate an image signal in which an image in which color or the like is changed according to the values of the optical characteristics is superimposed on a 2D or 3D image, an ultrasound image, or the like captured by various cameras.

The input unit 30 is realized by using an operation device such as a mouse, a keyboard, and a touch panel, and receives an input of various types of instruction information for the measuring apparatus 1.

The display unit 40 is configured by using a display such as liquid crystal or an organic electro luminescence (EL). The display unit 40 displays an image on the basis of the image signal output by the image generation unit 28.

The distance fixing mechanism 50 has an abutting portion 51 that abuts against the measurement object 2 and an arm portion 52 that fixes the distance between the measurement object 2 and the depth camera 10 to a predetermined value. The space between the depth camera 10 and the abutting portion 51 is, for example, an air layer, but the space may be a gas layer filled with other gas or a vacuum layer.

Figure 3:
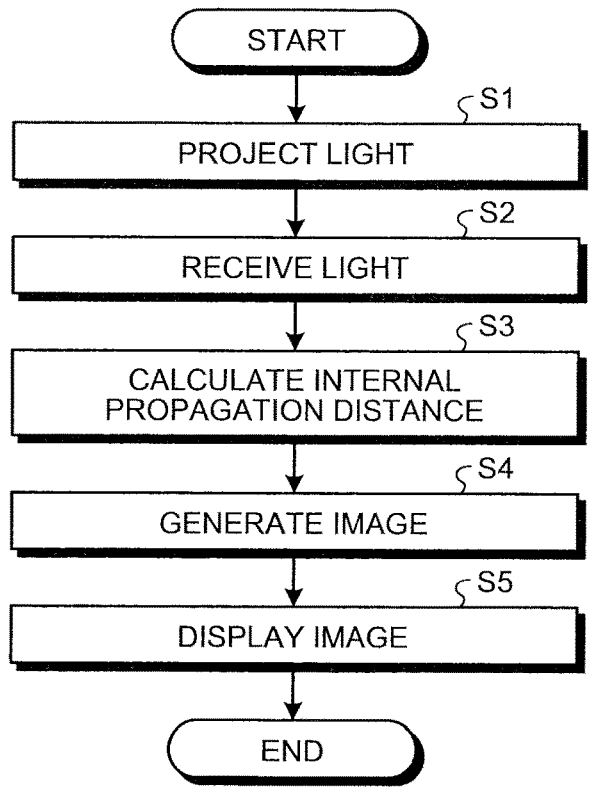
FIG. 3 is a flowchart illustrating an operation of measuring a measurement object by the measuring apparatus illustrated in FIG. 1.

FIG. 3 is a flowchart illustrating an operation of measuring the measurement object by the measuring apparatus illustrated in FIG. 1. As illustrated in FIG. 3, first, the light source driving device 12 projects light from the light source 11 onto the measurement object 2 through the illumination lens 13 under the control of the control unit 21 (Step S1).

At the same time, the photodetector 16 is synchronously controlled by the control unit 21 and receives light which is backscattered in the measurement object 2 and passes through the light receiving lens 14 and the wavelength filter 15 (Step S2). The photodetector 16 converts the received optical signal into an electric signal. In addition, the electric signal is amplified by the amplifier 17, AD-converted by the AD converter 18, and output to the processing device 20.

Subsequently, the internal propagation distance calculation unit 26 calculates the internal propagation distance $\Delta Z$ according to the output of the depth camera 10 (Step S3). Specifically, the TOF measurement unit 22 calculates the phase shift $\phi$ of the intensity modulation between the light projected from the light source 11 and the light received by the photodetector 16, and the distance calculation unit 23 calculates the flight distance Zs according to the phase shift $\phi$. In addition, the Zo acquisition unit 24 acquires the reference distance Zo from the control unit 21. Then, the internal propagation distance calculation unit 26 calculates the difference between the flight distance Zs and the reference distance Zo and calculates the internal propagation distance $\Delta Z$.

After that, the inverse analysis calculation unit 27 calculates optical characteristics of the measurement object 2, and the image generation unit 28 generates an image according to the optical characteristics (Step S4). Specifically, the inverse analysis calculation unit 27 calculates the optical characteristics of the measurement object 2 by inverse analysis according to the internal propagation distance $\Delta Z$ calculated by the internal propagation distance calculation unit 26 and the light intensity A calculated by the light intensity calculation unit 25. The image generation unit 28 generates and outputs an image signal corresponding to the optical characteristics calculated by the inverse analysis calculation unit 27.

Then, the display unit 40 displays an image corresponding to the image signal output from the image generation unit 28 (Step S5).

As described above, according to the first embodiment, the light source device 10A and the light receiver 10B are arranged with respect to the measurement object 2 with an air layer interposed therebetween and are not in direct contact with the measurement object. In addition, since, as the distance acquisition unit, the distance fixing mechanism 50 fixes the distance between the light source device 10A and the measurement object 2 and the distance between the light receiver 10B and the measurement object 2 to the reference distance Zo, and the Zo acquisition unit 24 as the reference distance acquisition unit acquires the reference distance Zo, the internal propagation distance $\Delta Z$ is calculated, so that it is possible to calculate the optical characteristics of the inside of the measurement object 2.

Modified Example 1-1

Figure 4:
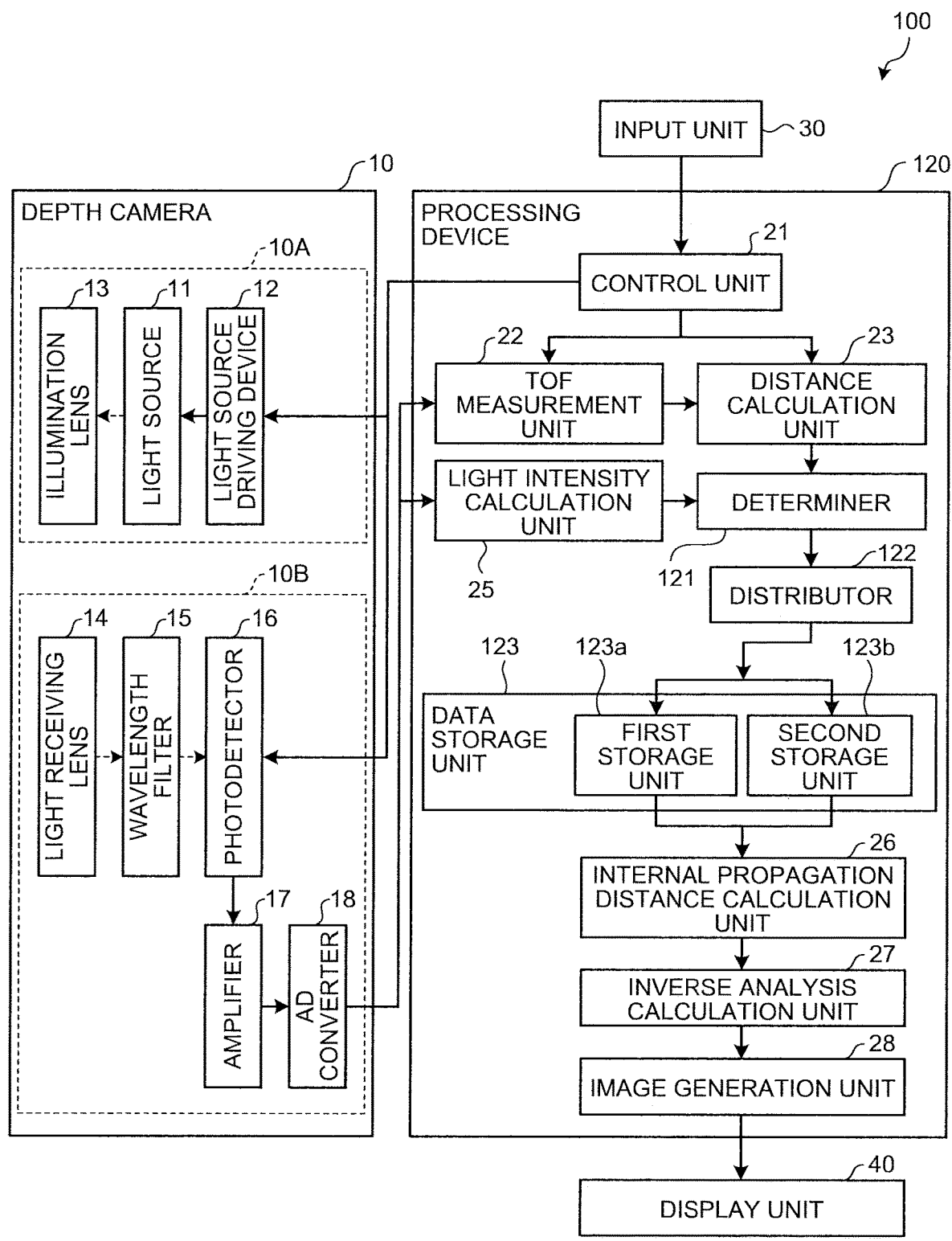
FIG. 4 is a schematic diagram illustrating a configuration of a measuring apparatus according to Modified Example 1-1 of the first embodiment.

FIG. 4 is a schematic diagram illustrating a configuration of a measuring apparatus according to Modified Example 1-1 of the first embodiment. A processing device 120 of a measuring apparatus 100 according to Modified Example 1-1 includes a determiner 121 that determines whether or not a light intensity calculated by the light intensity calculation unit 25 is equal to or larger than a predetermined threshold value, a distributor 122 that distributes data according to a determination result of the determiner 121, and a data storage unit 123 that stores the data.

Figure 5:
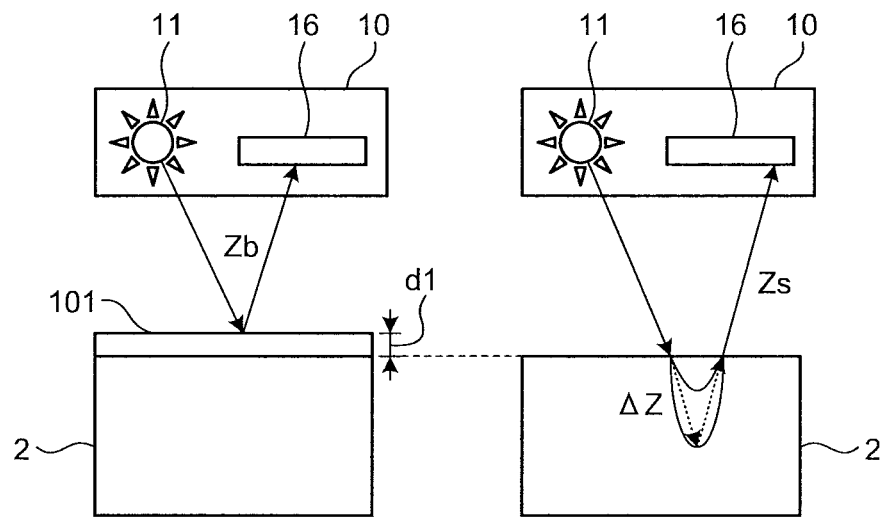
FIG. 5 is a diagram illustrating a state where a measurement object is measured by the measuring apparatus illustrated in FIG. 4.

FIG. 5 is a diagram illustrating a state where the measurement object is measured by the measuring apparatus illustrated in FIG. 4. As illustrated in FIG. 5, in the measuring apparatus 100, the distance Zb to the surface of a reference member 101 having a thickness d1 configured with a member having a high reflectance with respect to the wavelength band of the light projected from the light source 11 and the flight distance Zs are obtained by measurement.

Figure 6:
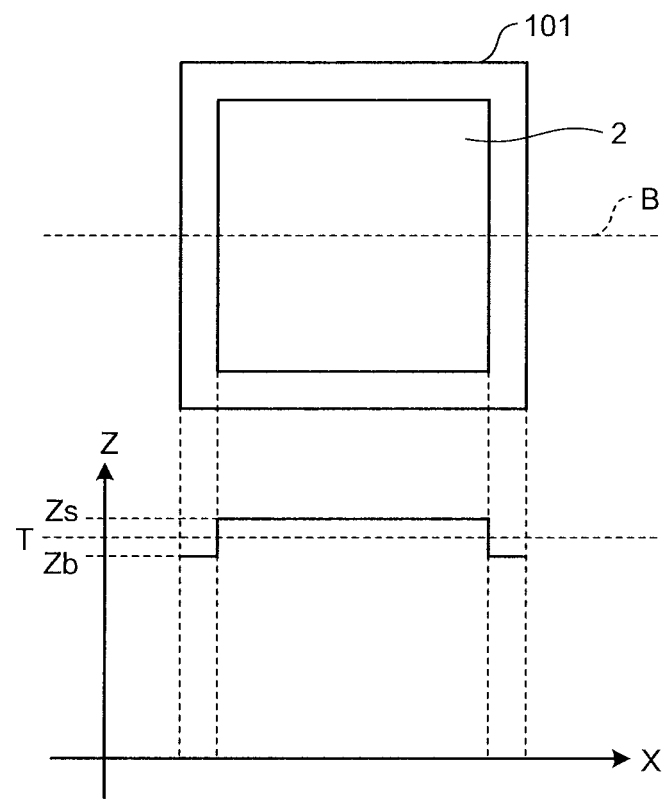
FIG. 6 is a diagram illustrating a measuring method of the measuring apparatus illustrated in FIG. 4.

FIG. 6 is a diagram illustrating a measuring method of the measuring apparatus illustrated in FIG. 4. As illustrated in FIG. 6, when the measurement object 2 is viewed from the above (the depth camera 10 side), the reference member 101 is arranged on the surface of the measurement object 2 so as to surround the range to be measured by using the depth camera 10. In addition, the horizontal axis (X axis) in FIG. 6 corresponds to the coordinate in the horizontal direction of FIG. 5, and the vertical axis (Z axis) in FIG. 6 corresponds to the coordinate in the vertical direction of FIG. 5. However, the arrangement of the reference members 101 is not particularly limited. For example, the reference members 101 may be arranged at the four corners or may be arranged as point-like markers.

The determiner 121 determines whether or not the distance calculated by the distance calculation unit 23 is equal to or larger than a predetermined threshold value. As illustrated in FIG. 6, the distance calculated on the broken line B is the distance Zb and the flight distance Zs. Therefore, in a case where the distance calculated by the distance calculation unit 23 is smaller than a threshold value T, the determiner 121 determines that the pixel is a pixel in which the reference member 101 is arranged and the light flies by the distance Zb. On the other hand, in a case where the distance calculated by the distance calculation unit 23 is equal to or larger than the threshold value T, the determiner 121 determines that the pixel is a pixel in which the reference member 101 is not arranged and the light flies by the flight distance Zs.

The distributor 122 distributes the distance calculated by the distance calculation unit 23 and the light intensity calculated by the light intensity calculation unit 25 according to the determination result of the determiner 121. Specifically, the distance and the light intensity of the pixel for which the determiner 121 determines that the light flies by the distance Zb and the distance and the light intensity of the pixel for which the determiner 121 determines that the light flies by the flight distance Zs are distributed to be stored in the data storage unit 123.

The data storage unit 123 includes a first storage unit 123a and a second storage unit 123b. The distance and the light intensity of the pixel where the light flies by the distance Zb are stored in the first storage unit 123a by the distributor 122. The distance and the light intensity of the pixel where the light flies by the flight distance Zs are stored in the second storage unit 123b by the distributor 122.

The internal propagation distance calculation unit 26 calculates the internal propagation distance $\Delta Z$ in the measurement object 2 according to the distance Zb and the flight distance Zs. Specifically, the internal propagation distance $\Delta Z$ can be calculated by the following equation (4).

$$\Delta Z = 2 \times (Zs - Zb) - 2d1 \quad (4)$$

In addition, in a case where the thickness d1 of the reference member 101 is a value small enough to be ignored with respect to the internal propagation distance $\Delta Z$, the internal propagation distance may be approximated to $\Delta Z = Zs - Zb$.

As described above, according to Modified Example 1-1, the light source device 10A and the light receiver 10B are arranged with respect to the measurement object 2 with an air layer interposed therebetween and are not in direct contact with the measurement object. In addition, in Modified Example 1-1, the reference member 101 is arranged as the distance acquisition unit, and the distance to the reference member 101 is measured, so that the distances from the surface of the measurement object 2 to the light source device 10A and the light receiver 10B are acquired respectively. As a result, the internal propagation distance $\Delta Z$ can be calculated, so that it is possible to calculate the optical characteristics of the inside of the measurement object 2.

In addition, in Modified Example 1-1, the reference member 101 is arranged on a portion of the region to be measured by using the depth camera 10, and the distance Zb and the flight distance Zs are measured by one-time measurement, but the disclosure is not limited thereto. For example, the distance Zb may be measured in the state where the reference member 101 is arranged so as to cover the surface of the measurement object 2, and after that, the flight distance Zs may be measured in the state where the reference member 101 is removed. In this case, it is possible to measure the inside of the measurement object 2 in the entire range measured by the depth camera 10.

Modified Example 1-2

Figure 7:
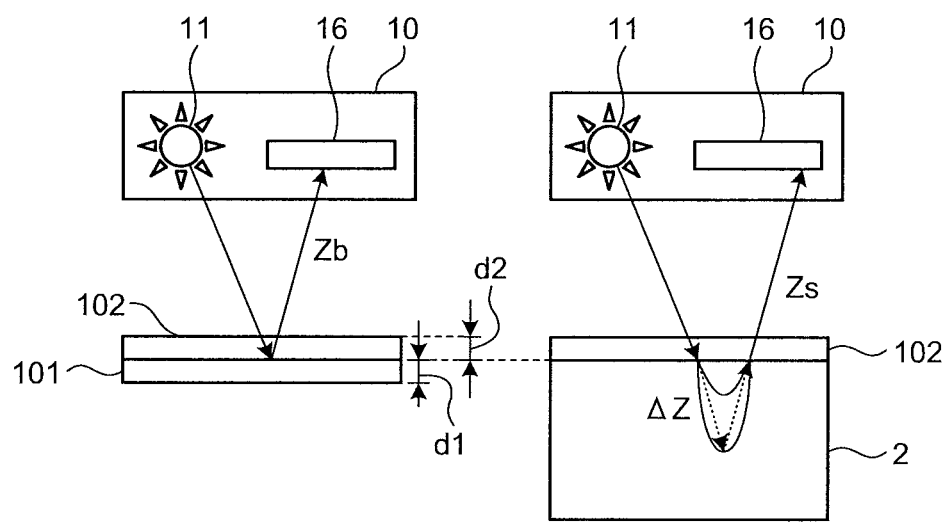
FIG. 7 is a diagram illustrating a state where a measurement object is measured by a measuring apparatus according to Modified Example 1-2 of the first embodiment.

FIG. 7 is a diagram illustrating a state where a measurement object is measured by a measuring apparatus according to Modified Example 1-2 of the first embodiment. As illustrated in FIG. 7, in this measuring apparatus, the distance Zb to the surface of the reference member 101 having a thickness d1 configured with a member having a high reflectance with respect to the wavelength band of the light projected from the light source 11 through a transparent member 102 having a thickness d2 configured with a transparent member such as glass or plastic and the flight distance Zs are obtained by measurement. The reference member 101 is arranged on the surface of the transparent member 102. Similarly to Modified Example 1-1, the reference member 101 is arranged in a portion of the region to be measured by the depth camera 10. In addition, it is preferable that a matching agent such as a liquid having a high transmittance is inserted into the interface between the reference member 101 and the transparent member 102 and the interface between the transparent member 102 and the measurement object 2 in order to reduce the reflection on these interfaces.

The internal propagation distance calculation unit 26 calculates the internal propagation distance $\Delta Z$ in the measurement object 2 according to the distance Zb and the flight distance Zs. Herein, since the reciprocating distance of the thickness d2 of the transparent member 102 is included in both of the distance Zb and the flight distance Zs, it is not necessary to consider the thickness d2 in the calculation of the internal propagation distance $\Delta Z$. Therefore, more specifically, the internal propagation distance $\Delta Z$ may be calculated by using the above-described equation (4). In addition, in a case where the thickness d1 of the reference member 101 is a value small enough to be ignored with respect to the internal propagation distance $\Delta Z$, the internal propagation distance may be approximated to $\Delta Z = Zs - Zb$.

In this manner, the reference member 101 may be arranged on the transparent member 102. Even in this case, similarly to Modified Example 1-1, the distance Zb may be measured in the state where the reference member 101 is arranged so as to cover the surface of the measurement object 2, and after that, the flight distance Zs may be measured in the state where the reference member 101 is removed.

Modified Example 1-3

Figure 8:
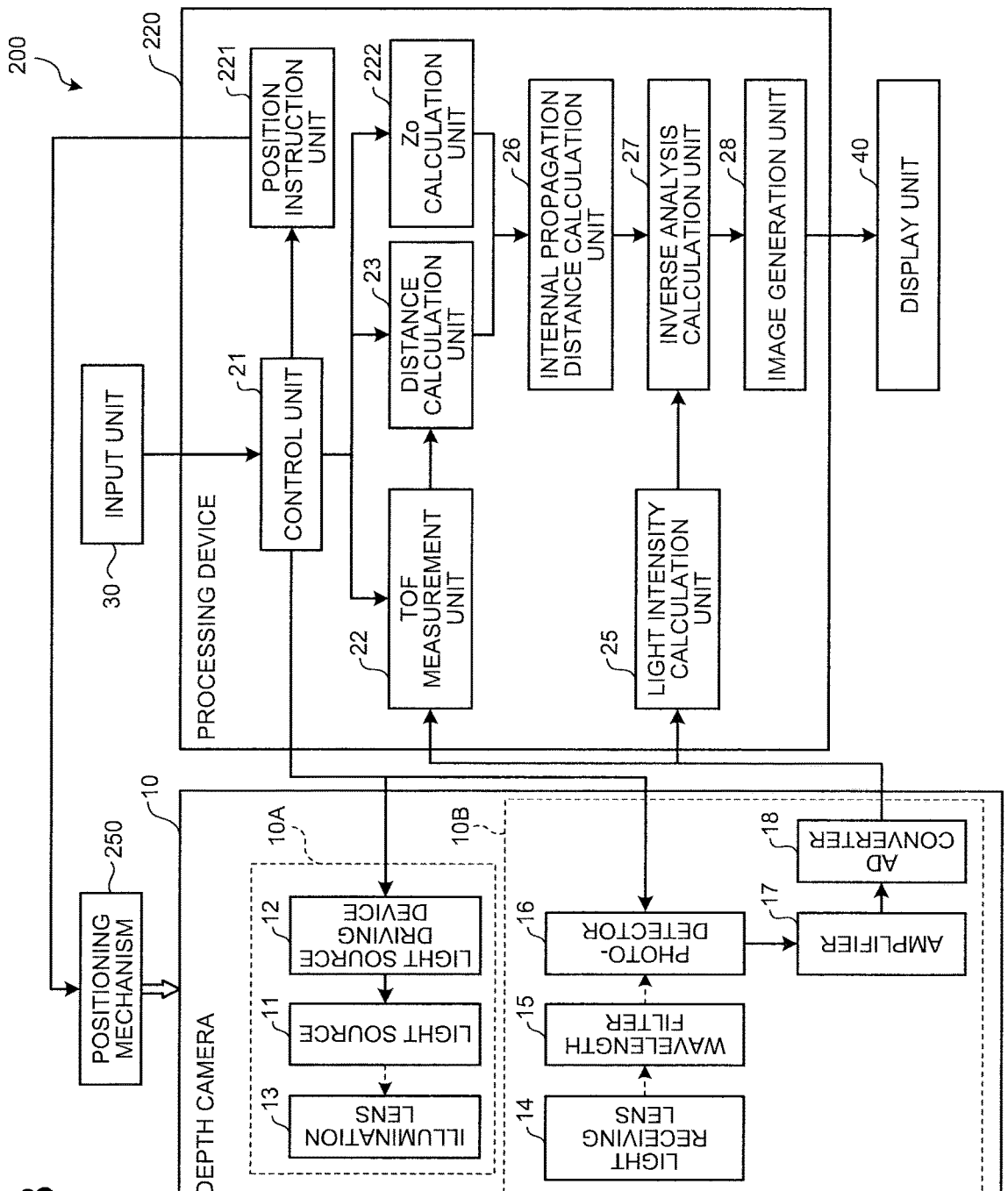
FIG. 8 is a schematic diagram illustrating a configuration of a measuring apparatus according to Modified Example 1-3 of the first embodiment.

FIG. 8 is a schematic diagram illustrating a configuration of a measuring apparatus according to Modified Example 1-3 of the first embodiment. A processing device 220 of a measuring apparatus 200 according to Modified Example 1-3 includes a position instruction unit 221 that controls a positioning mechanism 250, and a Zo calculation unit 222 as a reference distance calculation unit that calculates a reference distance Zo which is a separation distance between the measurement object 2 and the depth camera 10.

Figure 9:
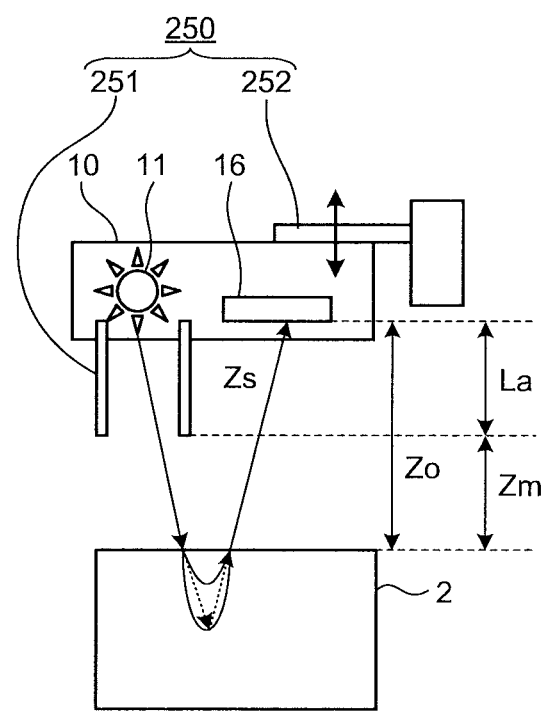
FIG. 9 is a diagram illustrating a state where a measurement object is measured by the measuring apparatus illustrated in FIG. 8.

FIG. 9 is a diagram illustrating a state where a measurement object is measured by the measuring apparatus illustrated in FIG. 8. As illustrated in FIG. 9, the positioning mechanism 250 of the measuring apparatus 200 includes a pushing member 251 having a length La that can be brought into contact with the surface of the measurement object 2 and a movable unit 252 that vertically moves the pushing member 251 and the depth camera 10. Under the control of the position instruction unit 221, the positioning mechanism 250 brings the distal end of the pushing member 251 into contact with the surface of the measurement object 2. Then, the movable unit 252 is returned by the distance Zm from the position, and measurement is performed in this state.

The Zo calculation unit 222 acquires the length La of the pushing member 251 and a predetermined distance Zm from the control unit 21 and calculates the reference distance Zo as Zo=La+Zm.

As described above, according to Modified Example 1-3, the light source device 10A and the light receiver 10B are arranged with respect to the measurement object 2 with an air layer interposed therebetween and are not in direct contact with the measurement object. In addition, in Modified Example 1-3, since the reference distance Zo can be calculated by the positioning mechanism 250 as the distance acquisition unit, the position instruction unit 221, and the Zo calculation unit 222 as the reference distance calculation unit, the internal propagation distance $\Delta Z$ can be calculated, so that it is possible to calculate the optical characteristics of the inside of the measurement object 2.

In addition, the positioning mechanism 250 may be configured to change only the length of the pushing member 251 by expanding and contracting the pushing member 251.

Modified Example 1-4

Figure 10:
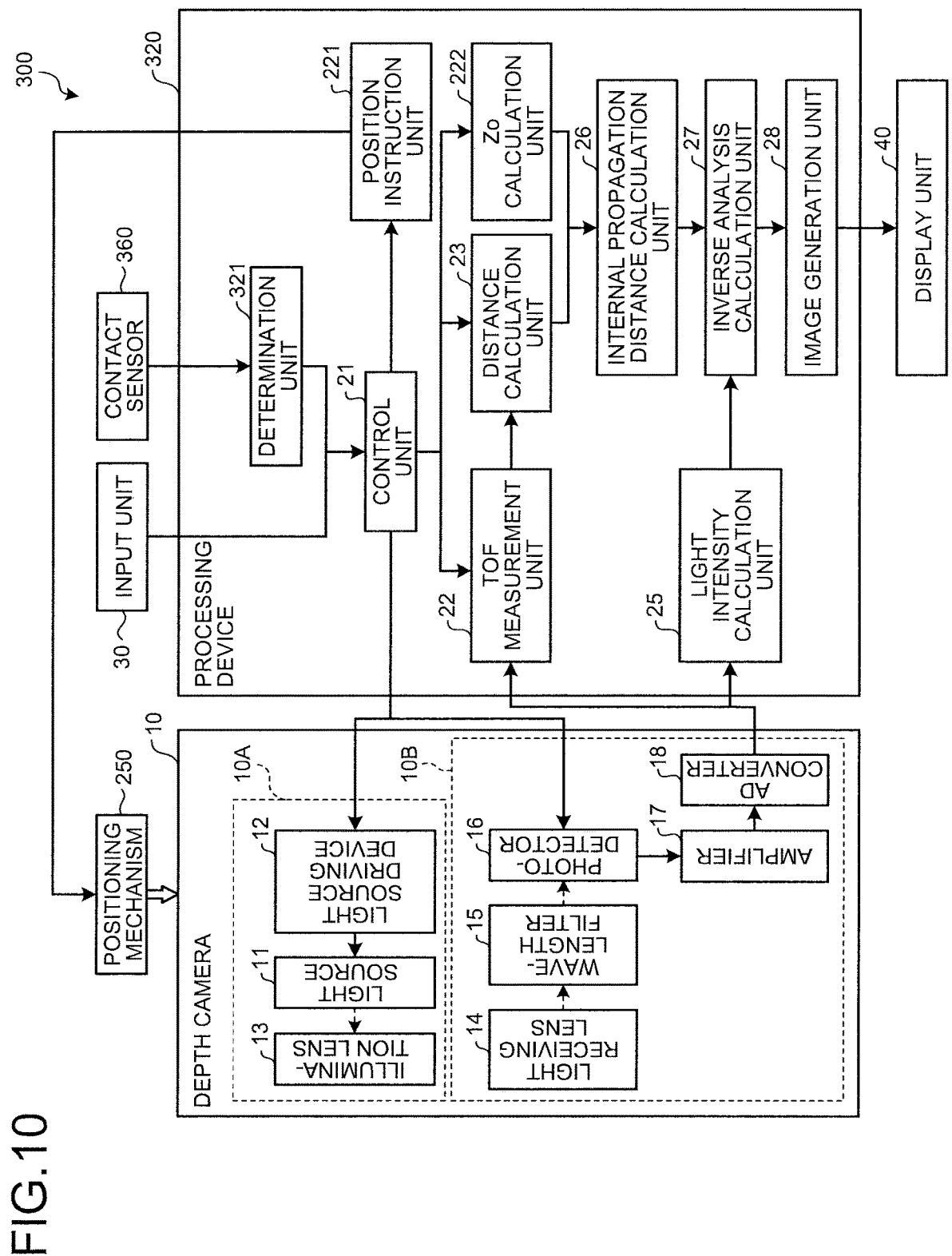
FIG. 10 is a schematic diagram illustrating a configuration of a measuring apparatus according to Modified Example 1-4 of the first embodiment.
Figure 11:
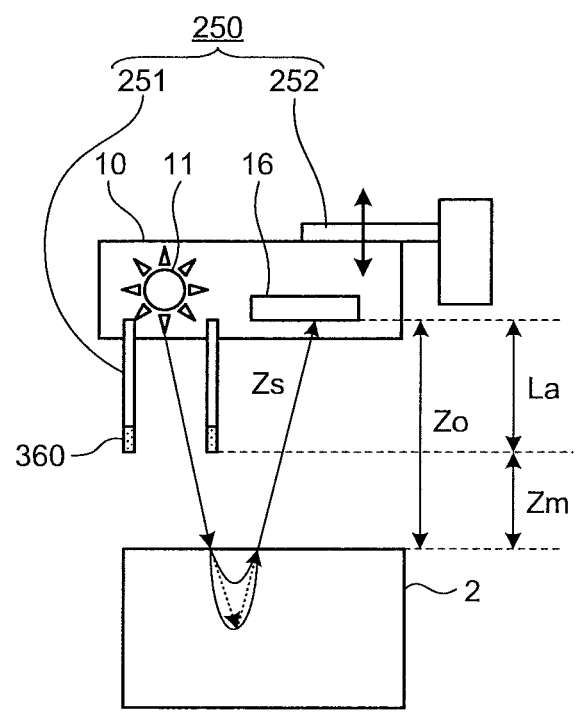
FIG. 11 is a diagram illustrating a state where a measurement object is measured by the measuring apparatus illustrated in FIG. 10.

FIG. 10 is a schematic diagram illustrating a configuration of a measuring apparatus according to Modified Example 1-4 of the first embodiment. FIG. 11 is a diagram illustrating a state where a measurement object is measured by the measuring apparatus illustrated in FIG. 10. A measuring apparatus 300 according to Modified Example 1-4 has a configuration where a contact sensor 360 is arranged at the distal end of the pushing member 251 according to Modified Example 1-3. A processing device 320 of the measuring apparatus 300 includes a determination unit 321 that determines whether or not the contact sensor 360 detects contact.

With this configuration, the contact sensor 360 can accurately detect whether the distal end of the pushing member 251 is in contact with the surface of the measurement object 2. For this reason, the elastic measurement object 2 is prevented from being depressed by the pushing member 251, and thus, an error is prevented from occurring in the reference distance Zo calculated by the Zo calculation unit 222.

Modified Example 1-5

Figure 12:
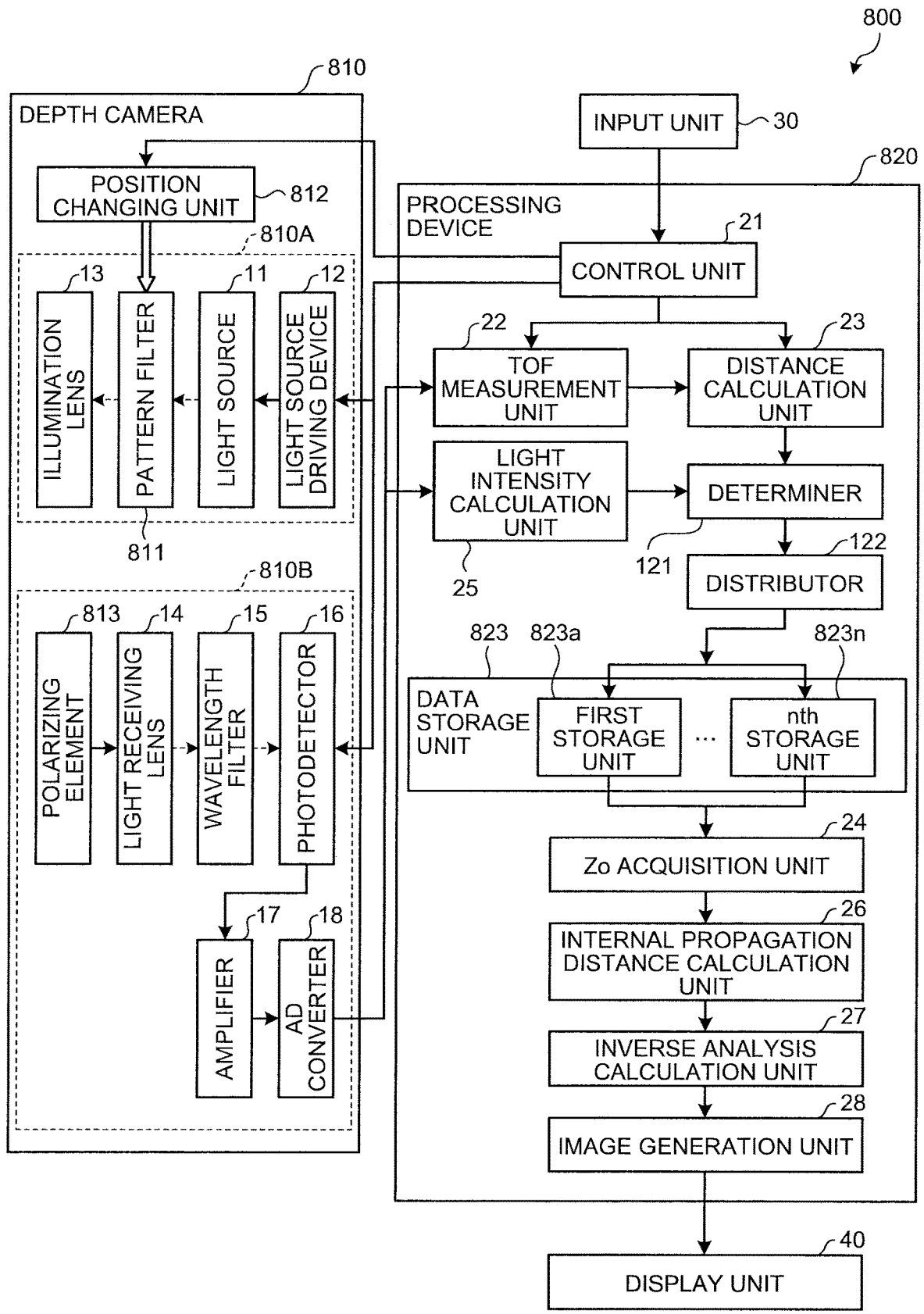
FIG. 12 is a schematic diagram illustrating a configuration of a measuring apparatus according to Modified Example 1-5 of the first embodiment.

FIG. 12 is a schematic diagram illustrating a configuration of a measuring apparatus according to Modified Example 1-5 of the first embodiment. As illustrated in FIG. 12, in a depth camera 810 of a measuring apparatus 800 according to Modified Example 1-5, a light source device 810A includes a light source 11 that projects light onto a measurement object, a pattern filter 811 as an optical element that transmits light so that the light projected from the light source 11 onto the measurement object forms an illuminance distribution where bright portions and dark portions are periodically repeated spatially, and a position changing unit 812 as an illuminance distribution changer that changes the illuminance distribution by moving a position of the pattern filter 811. A light receiver 810B includes a polarizing element 813 that selectively transmits light having a predetermined polarization. A processing device 820 of the measuring apparatus 800 includes a data storage unit 823 having n storage units (a first storage unit 823a to an nth storage unit 823n). In addition, the light receiver 810B may have a configuration without the polarizing element 813.

Figure 13:
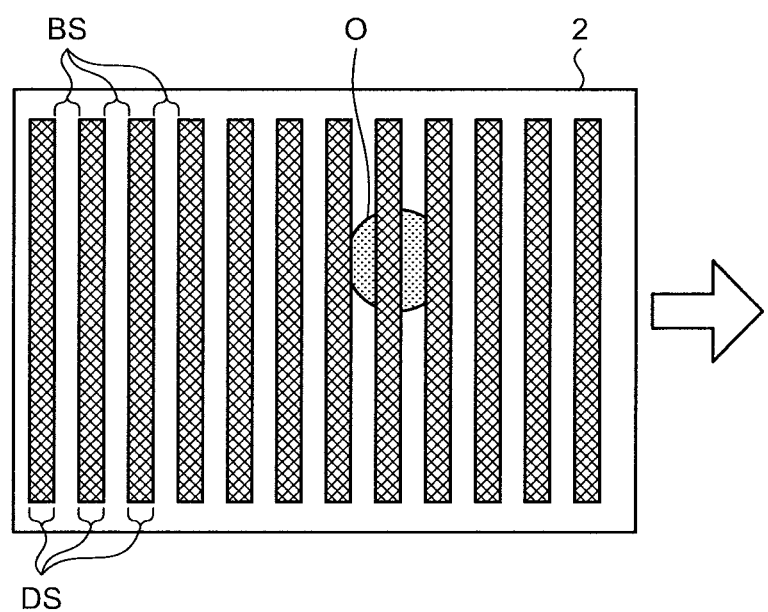
FIG. 13 is a diagram illustrating a state where a measurement object is measured by the measuring apparatus illustrated in FIG. 12.

FIG. 13 is a diagram illustrating a state where the measurement object is measured by the measuring apparatus illustrated in FIG. 12. As illustrated in FIG. 13, the light projected from the light source 11 of the light source device 810A is selectively transmitted by the pattern filter 811, and the light is projected onto the measurement object 2 having the observation object O of a tumor or the like as a fine striped pattern where the bright portions BS and the dark portions DS are periodically repeated. The pattern filter 811 is used to realize so-called structured illumination. Then, the photodetector 16 of the light receiver 810B receives the backscattered light of the projected light from the measurement object 2 through the polarizing element 813. In addition, the position changing unit 812 moves the pattern filter 811 in a direction perpendicular to the light projected from the light source 11.

Figure 14:
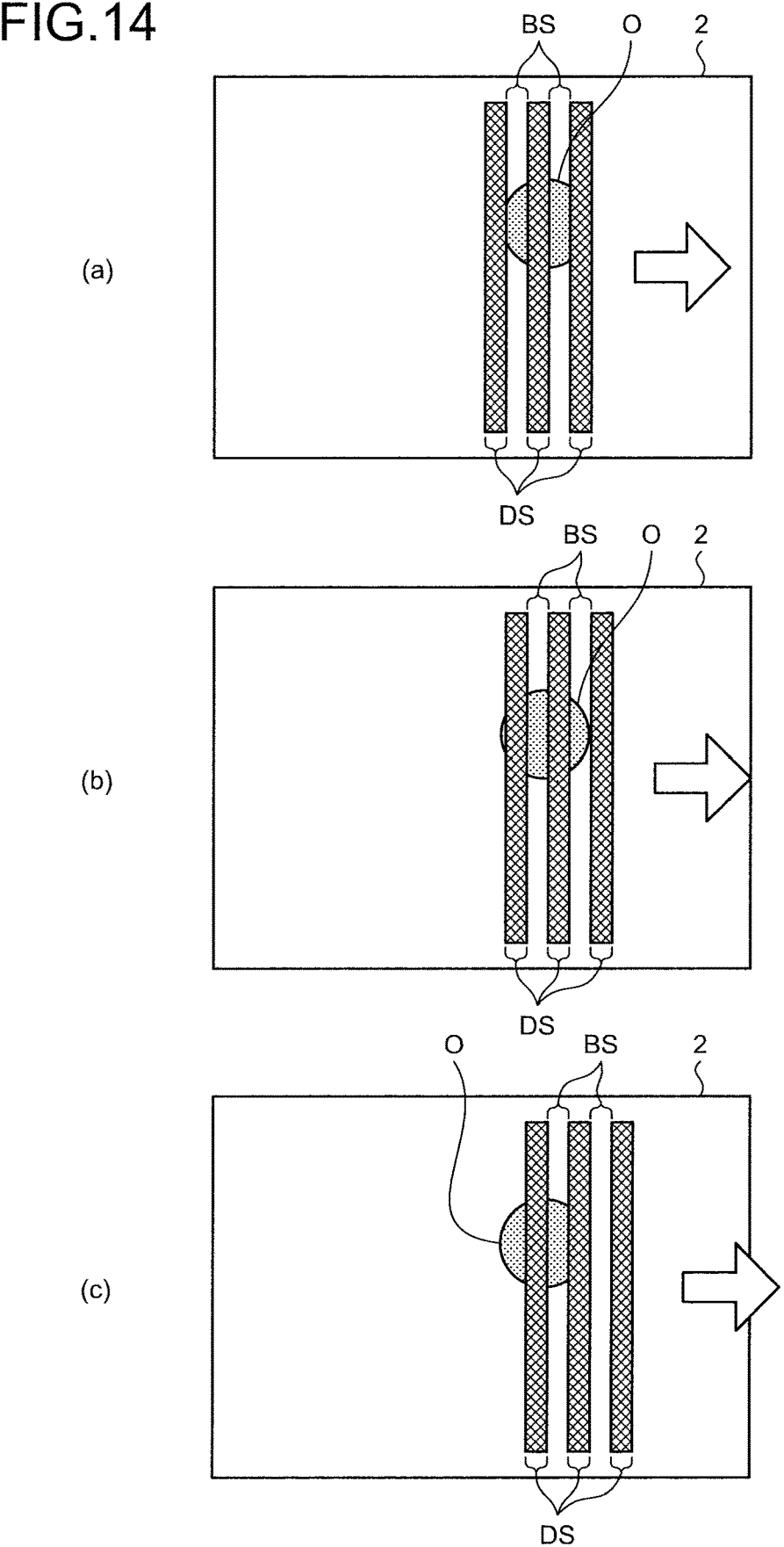
FIG. 14 is a diagram illustrating a state where a position changing unit illustrated in FIG. 12 moves a pattern filter.

FIG. 14 is a diagram illustrating a state where the position changing unit illustrated in FIG. 12 moves the pattern filter. As illustrated in (a), (b), and (c) of FIG. 14, when the position changing unit 812 moves the pattern filter 811, the bright portion BS and the dark portion DS are moved. In addition, in FIG. 14, only three dark portions DS among the plurality of dark portions DS illustrated in FIG. 13 are illustrated. The position changing unit 812 moves the pattern filter 811 n times at equal intervals. At this time, the bright portion BS and the dark portion DS are moved by a total of one pitch (until the bright portion BS and the dark portion DS are moved to the adjacent bright portion BS and the adjacent dark portion DS). Then, every time when the pattern filter 811 is moved by the position changing unit 812, the light receiver 810B receives backscattered light and acquires n measurement results. The n measurement results are stored in the first storage unit 823a to the nth storage unit 823n, respectively.

Figure 15:
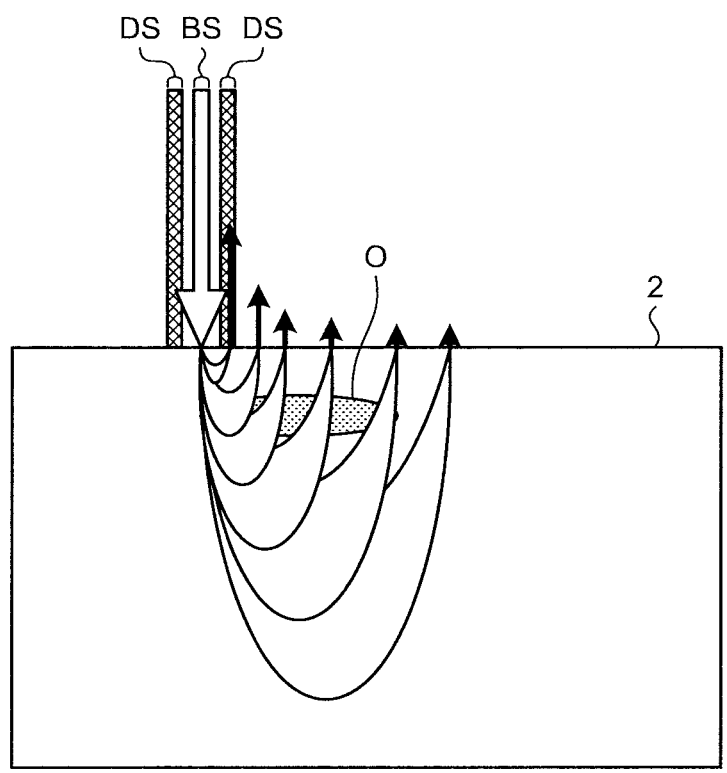
FIG. 15 is a diagram illustrating a measuring method of the measuring apparatus illustrated in FIG. 12.

The Zo acquisition unit 24 calculates the reference distance Zo by using the measurement results of the bright portion BS and the dark portion DS of the n rays of the backscattered light stored in the first storage unit 823a to the nth storage unit 823n. FIG. 15 is a diagram illustrating a measuring method of the measuring apparatus illustrated in FIG. 12. As illustrated in FIG. 15, the light received from the dark portion DS is light that is multiple-scattered inside the measurement object 2 excluding a direct reflected component that is reflected on the surface of the measurement object 2 and a single scattered component that is scattered only once on the surface layer of the measurement object 2. On the other hand, the light received from the bright portion BS is light including components of direct reflection, single scattering, and multiple scattering. In FIG. 15, only two dark portions DS out of the plurality of dark portions DS illustrated in FIG. 13 are illustrated.

Herein, the phase of the measurement result in a case where the illumination is not structured illumination is denoted by $\varphi o$ (median), the amplitude is denoted by $\alpha o$ (median), the phase of the direct component (direct reflection and single scattering) is denoted by $\varphi d$, the amplitude is denoted by $\alpha d$, the phase of the indirect component (multiple scattering) is denoted by $\varphi g$, and the amplitude is denoted by $\alpha g$. In this case, the returning light of the intensity-modulated light projected from the light source 11 is expressed by the following equation (5) by a correlation function $c(\tau)$ using a phase delay $\tau$ of the returning light. In addition, fm is the frequency of the intensity modulation, and $\beta$ is the intensity (intermediate value).

$$c(\tau) = \frac{\alpha_o}{2}\cos(fm \cdot \tau + \varphi_o) \qquad (5)$$
$$= \frac{\alpha d}{2}\cos(fm \cdot \tau + \varphi d) + \frac{\alpha g}{2}\cos(fm \cdot \tau + \varphi g) + \beta$$

The following equations (6) and (7) are derived from the equation (5).

$$\varphi_o = \arctan\left(\frac{\alpha d \sin\varphi d + \alpha g \sin\varphi g}{\alpha d \cos\varphi d + \alpha g \cos\varphi g}\right) \qquad (6)$$

$$\alpha_o^2 = \alpha d^2 + \alpha g^2 + 2\alpha d \cdot \alpha g \cos(\varphi d - \varphi g) \qquad (7)$$

Herein, the measurement result of the bright portion BS corresponds to the equations (6) and (7), and the measurement result of the dark portion DS corresponds to two equations in which $\alpha d=0$ in the equations (6) and (7), so that four equations are obtained from the measurement results. By solving the simultaneous equations by using these four equations and inserting the solution into the following equation (8) derived from the equations (6) and (7), the phase $\varphi d_h$ (estimated value) of the direct component is obtained.

$$\varphi d_h = \arctan\left(\frac{\alpha d \cdot \gamma + \alpha g(\sin(\varphi d - \varphi g) + \gamma \cos(\varphi d - \varphi g))}{\alpha d + \alpha g(\cos(\varphi d - \varphi g) - \gamma \sin(\varphi d - \varphi g))}\right) \qquad (8)$$

By calculating this distance by using this phase $\varphi d_h$ similarly to the equation (1), the reference distance Zo can be calculated.

The internal propagation distance calculation unit 26 calculates the internal propagation distance $\Delta Z$ by using the n measurement results stored in the first storage unit 823a to the nth storage unit 823n. Specifically, the internal propagation distance calculation unit 26 calculates the internal propagation distance $\Delta Z$ by using the n measurement results of the dark portion DS of the backscattered light received by the light receiver 810B. As described above, since the light received from the dark portion DS is multiple-scattered light inside the measurement object 2, the flight distance Zs is calculated from the measurement result, and the internal propagation distance ΔZ is calculated by the equation (3) by using the reference distance Zo calculated by the Zo acquisition unit 24.

According to Modified Example 1-5, since the reference distance Zo is calculated by using structured illumination, even if the surface of the measurement object 2 has unevenness, it is possible to accurately calculate the reference distance Zo.

Figure 16:
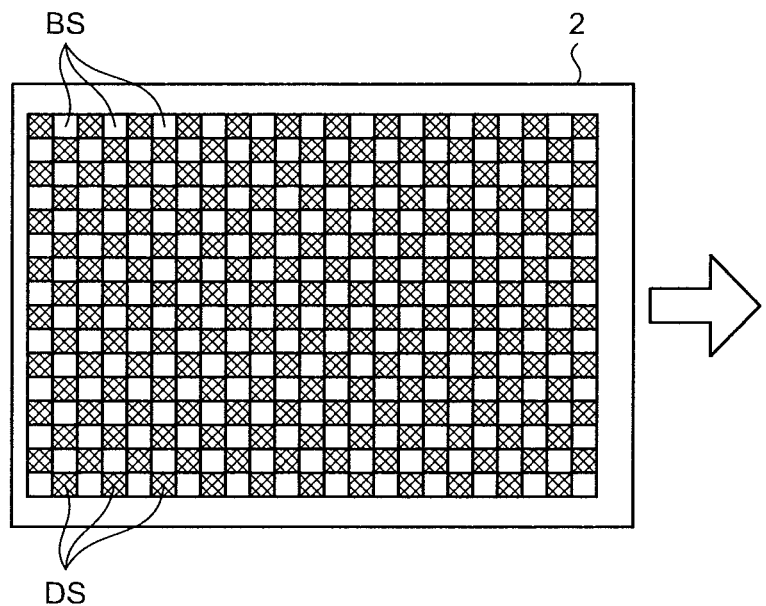
FIG. 16 is a diagram illustrating a modified example of the pattern filter.
Figure 17:
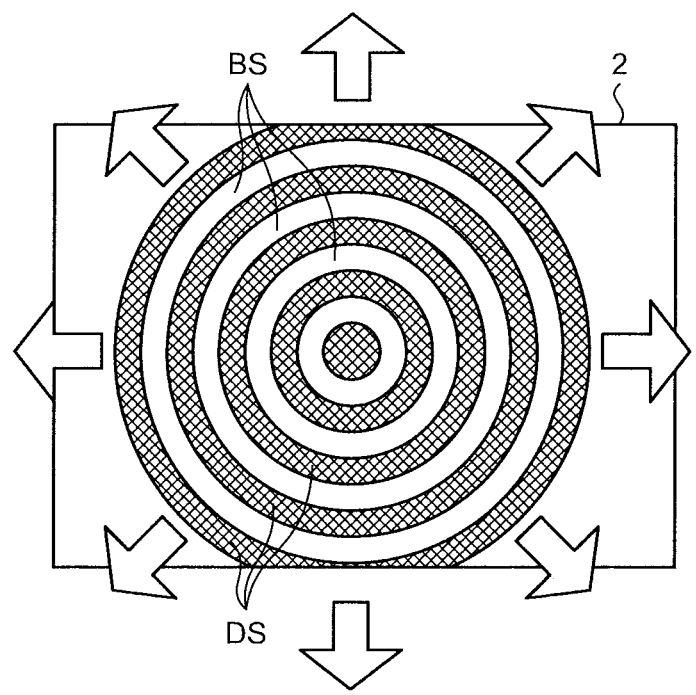
FIG. 17 is a diagram illustrating a modified example of the pattern filter.

In addition, although the above-described pattern filter 811 has been described as having a striped pattern, the disclosure is not limited thereto. The pattern filter 811 may have a configuration having a fine pattern capable of realizing structured illumination. FIGS. 16 and 17 are diagrams illustrating modified examples of the pattern filter. As illustrated in FIG. 16, the pattern filter 811 may have a checkered pattern where the bright portions BS and the dark portions DS are arranged in a fine grid shape. In this case, the position changing unit 812 moves the pattern filter 811 in the horizontal direction or the vertical direction. In addition, as illustrated in FIG. 17, the pattern filter 811 may have a pattern where the bright portions BS and the dark portions DS are arranged in a fine concentric shape. In this case, the position changing unit 812 moves the pattern filter 811 so as to be far away from or close to the light source 11. Then, concentric stripes are moved radially outward or inward.

In addition, in the example described above, the example where the light receiver 810B acquires a plurality of measurement results has been described, but the disclosure is not limited thereto. For example, the light receiver 810B projects the structured illumination onto a portion of the measurement object 2 and projects the intensity-modulated light onto the observation area of the measurement object 2 to acquire the backscattered light once. In this case, the reference distance Zo is calculated from the backscattered light of the structured illumination, and the internal propagation distance ΔZ of the observation area can be calculated by using the calculated reference distance Zo.

In addition, in the example described above, the example where the position changing unit 812 as the illuminance distribution changer moves the position of the pattern filter 811 has been described, but the disclosure is not limited thereto. The position changing unit as the illuminance distribution changer may move the position of the light source 11.

Modified Example 1-6

Figure 18:
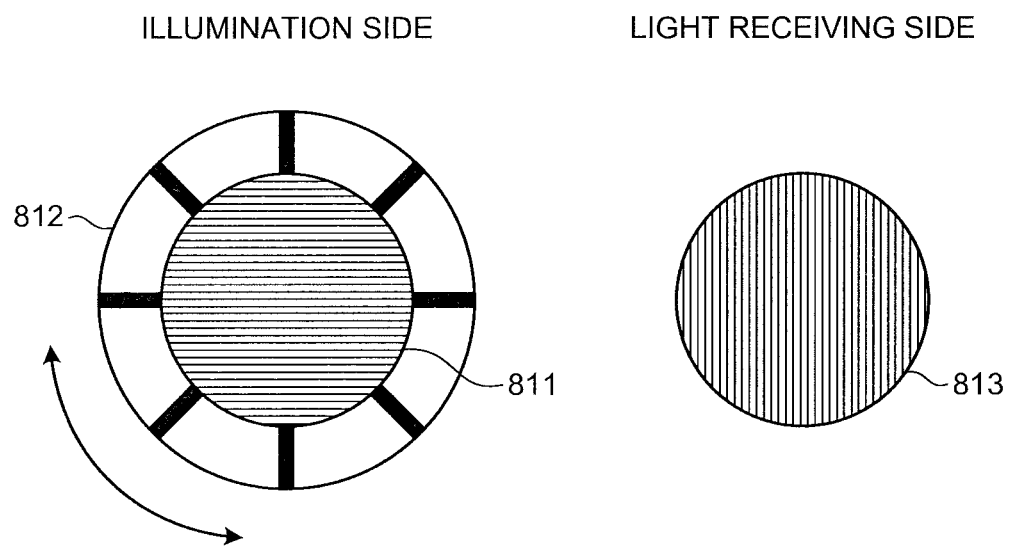
FIG. 18 is a diagram illustrating a pattern filter and a polarizing element of a measuring apparatus according to Modified Example 1-6 of the first embodiment.

A measuring apparatus according to Modified Example 1-6 has the same configuration as Modified Example 1-5, but the shapes and operations of the pattern filter 811, the position changing unit 812, and the polarizing element 813 are different. FIG. 18 is a diagram illustrating a pattern filter and a polarizing element of the measuring apparatus according to Modified Example 1-6 of the first embodiment. As illustrated in FIG. 18, a depth camera 810 of the measuring apparatus 800 according to Modified Example 1-6 includes a disk-shaped pattern filter 811 arranged on the illumination side (light source device 810A), a position changing unit 812 that rotates the pattern filter 811, and a disk-shaped polarizing element 813 arranged on the light receiving side (light receiver 810B).

Figure 19:
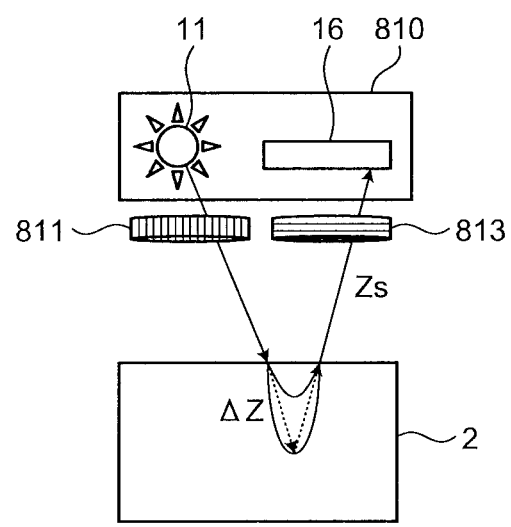
FIG. 19 is a diagram illustrating a state where a measurement object is measured by the measuring apparatus according to Modified Example 1-6 of the first embodiment.
Figure 20:
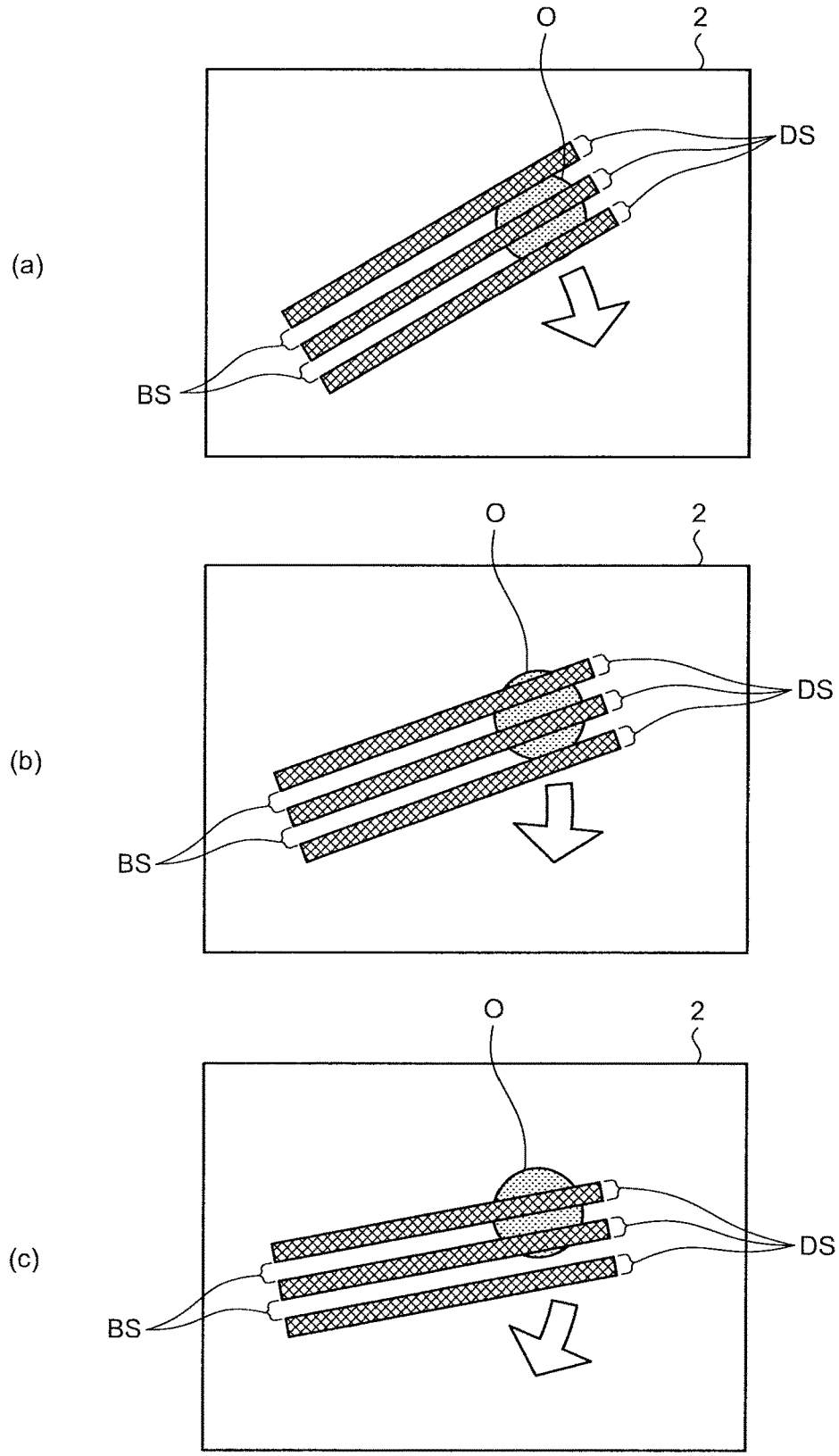
FIG. 20 is a diagram illustrating a measuring method of the measuring apparatus according to Modified Example 1-6 of the first embodiment.

FIGS. 19 and 20 are diagrams illustrating a measuring method of the measuring apparatus according to Modified Example 1-6 of the first embodiment. As illustrated in FIG. 19, the light projected from the light source 11 of the depth camera 810 is selectively transmitted by the pattern filter 811, and the light is projected onto the measurement object 2 having the observation object O of a tumor or the like as a fine striped pattern where the bright portions BS and the dark portions DS are periodically repeated. Then, the photodetector 16 of the light receiver 810B of the depth camera 810 receives the backscattered light of the projected light from the measurement object 2 through the polarizing element 813. In addition, as illustrated in (a), (b), and (c) of FIG. 20, the position changing unit 812 rotates the pattern filter 811 n times at the same angle. At this time, the position changing unit 812 rotationally moves the pattern filter 811 until the bright portion BS and the dark portion DS are moved to the positions of the adjacent bright portion BS and the adjacent dark portion DS. Then, every time when the pattern filter 811 is rotationally moved by the position changing unit 812, the light receiver 810B receives the backscattered light and acquires n measurement results. The n measurement results are stored in the first storage unit 823a to the nth storage unit 823n, respectively.

Similarly to Modified Example 1-5, the internal propagation distance calculation unit 26 calculates the internal propagation distance ΔZ by using the measurement results stored in the first storage unit 823a to the nth storage unit 823n.

Modified Example 1-7

Figure 21:
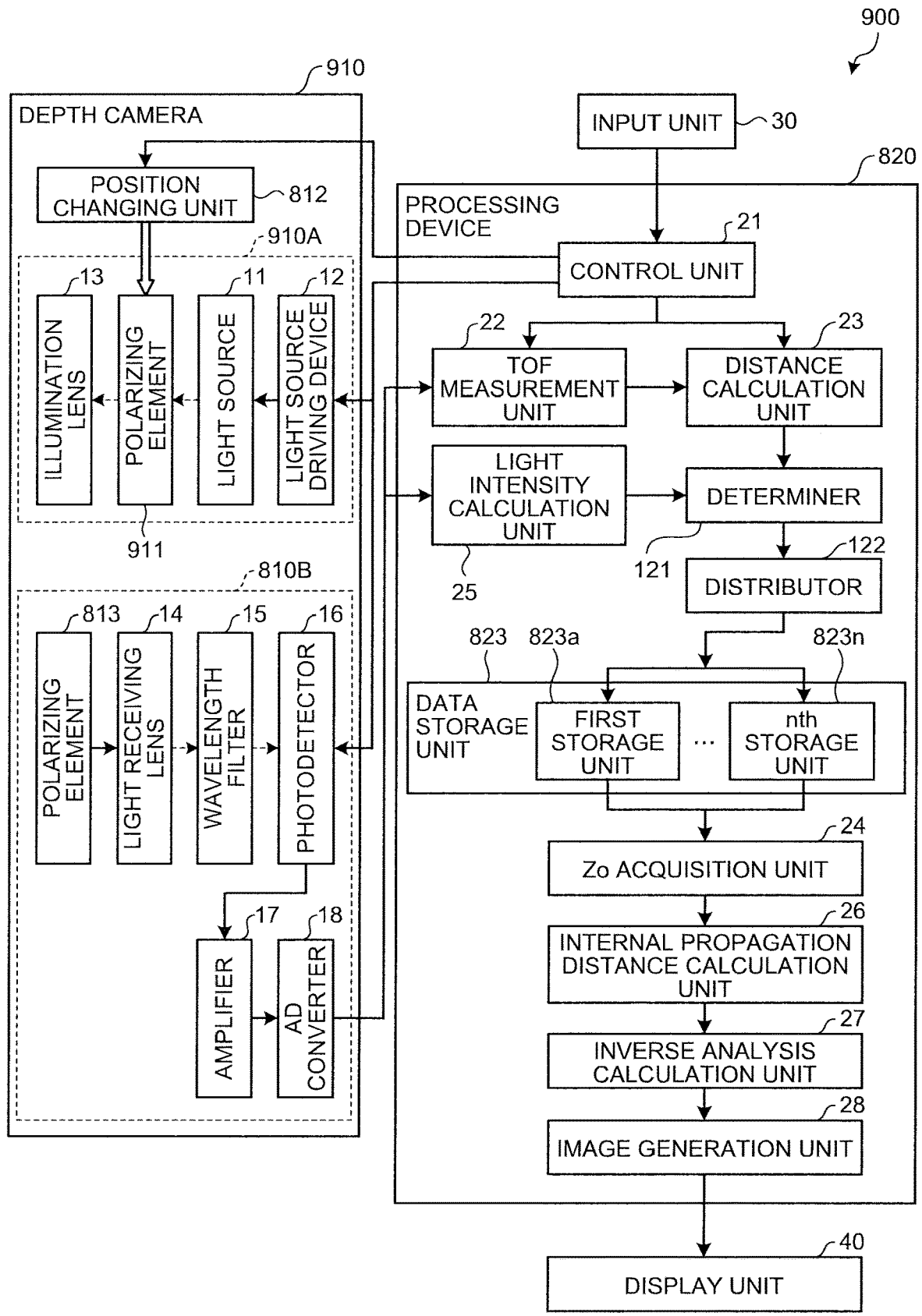
FIG. 21 is a schematic diagram illustrating a configuration of a measuring apparatus according to Modified Example 1-7 of the first embodiment.

FIG. 21 is a schematic diagram illustrating a configuration of a measuring apparatus according to Modified Example 1-7 of the first embodiment. As illustrated in FIG. 21, in a depth camera 910 of a measuring apparatus 900 according to Modified Example 1-7, instead of the pattern filter 811 according to Modified Example 1-5 illustrated in FIG. 12, a polarizing element 911 as an optical element is arranged in a light source device 910A. In this case, the polarizing element 911 and the polarizing element 813 are arranged in a parallel Nicols mode, and thus, direct components (direct reflection and single scattering) and indirect components (multiple scattering) can be measured, so that the reference distance Zo can be calculated from the measurement result. In addition, the polarizing element 911 and the polarizing element 813 are arranged in an orthogonal Nicols mode, only the indirect components (multiple scattering) can be measured, so that the internal propagation distance ΔZ can be calculated from the measurement result.

The polarizing element 911 and the polarizing element 813 are arranged in a partial Nicols in addition to the parallel Nicole mode and the orthogonal Nicole mode, the direction dependency of the single scattering and the multiple scattering can also be measured, so that the internal propagation distance ΔZ can be calculated with higher accuracy even with respect to the measurement object 2 having a non-uniform inside.

Second Embodiment

Figure 22:
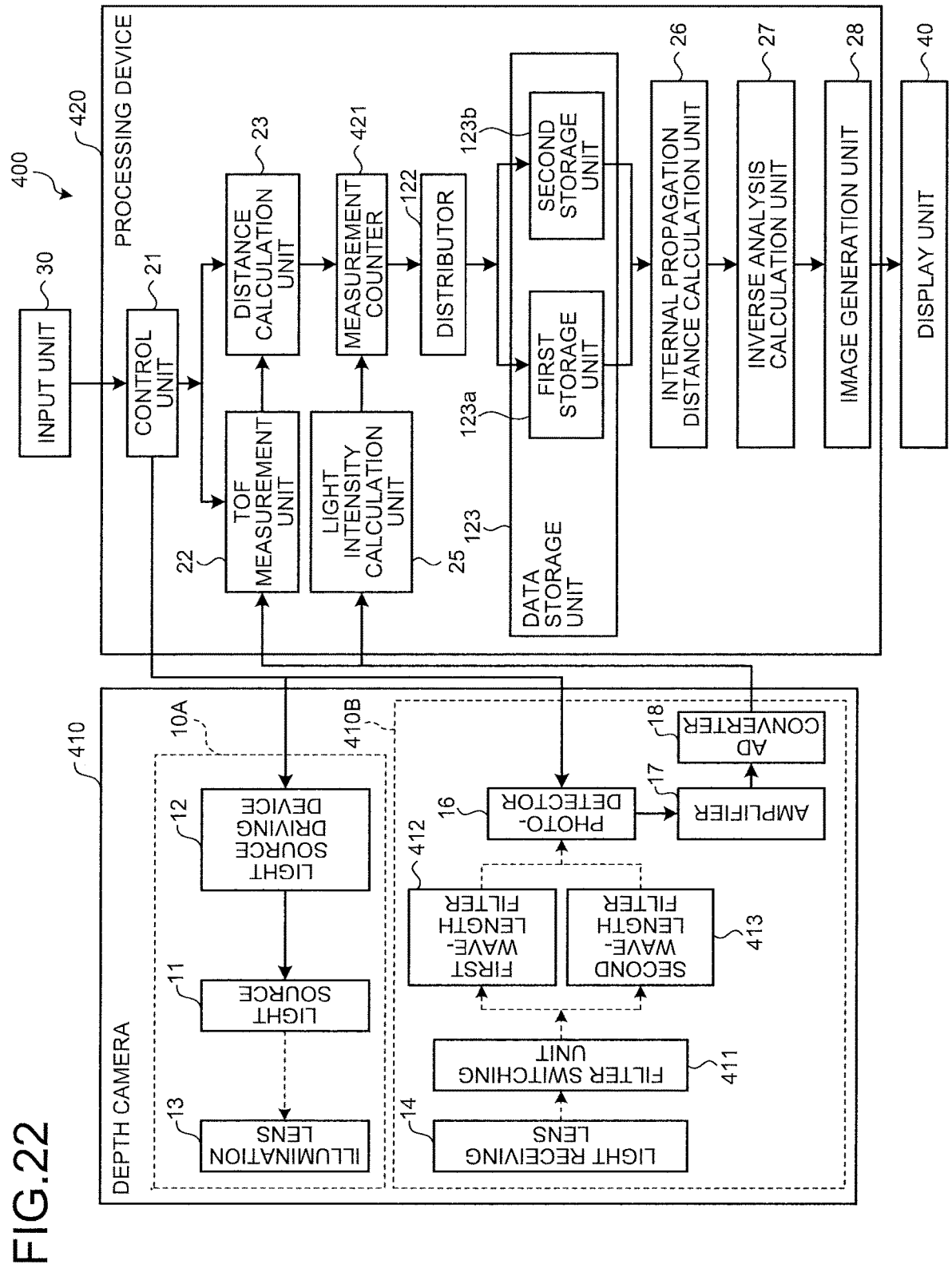
FIG. 22 is a schematic diagram illustrating a configuration of a measuring apparatus according to a second embodiment.

FIG. 22 is a schematic diagram illustrating a configuration of a measuring apparatus according to a second embodiment. The descriptions of components similar to those of the measuring apparatus 1 according to the first embodiment are appropriately omitted.

A light receiver 410B of a depth camera 410 of a measuring apparatus 400 includes a filter switching unit 411 that switches filters, a first wavelength filter 412 that transmits only light having a first wavelength band, and a second wavelength filter 413 that transmits only light having a second wavelength band.

The light source 11 is, for example, a xenon lamp that projects light having a broadband spectrum with a wavelength of 180 nm to 2000 nm. In a case where the measurement object 2 is a living body, a wavelength filter is arranged between the light source 11 and the illumination lens 13 so that light having an ultraviolet range which is harmful to the living body is not projected onto the measurement object 2. Alternatively, it is preferable to perform coating that does not allow light having a predetermined wavelength band to pass through the illumination lens 13.

The filter switching unit 411 switches the first wavelength filter 412 and the second wavelength filter 413, for example, according to user's input. In the measuring apparatus 400, measurement is performed at least two times. In the first-time measurement, the filter switching unit 411 arranges the first wavelength filter 412 on the optical path of the backscattered light from the measurement object 2, and in the second-time measurement, the filter switching unit 411 arranges the second wavelength filter 413 on the optical path of the backscattered light from the measurement object 2.

The first wavelength filter 412 is, for example, a band pass filter that transmits only light having the wavelength band in a near ultraviolet range. The second wavelength filter 413 is, for example, a band pass filter that transmits only the light having a wavelength in the vicinity of 540 nm.

Figure 23:
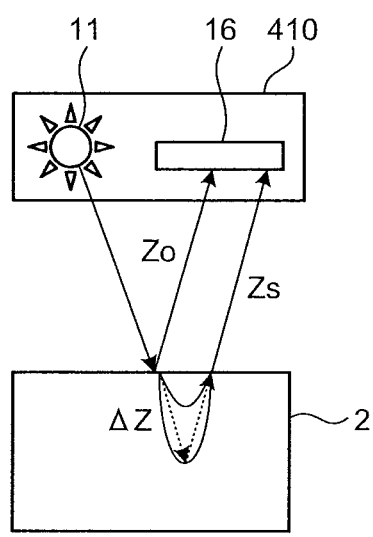
FIG. 23 is a diagram illustrating a state where a measurement object is measured by the measuring apparatus illustrated in FIG. 22.

FIG. 23 is a diagram illustrating a state where the measurement object is measured by the measuring apparatus illustrated in FIG. 22. As illustrated in FIG. 23, light having the near-ultraviolet range transmitted by the first wavelength filter 412 is light backscattered in the outermost surface layer of the measurement object 2, and the flight distance of this light may be approximated to the reference distance Zo. On the other hand, light having a wavelength of 540 nm transmitted by the second wavelength filter 413 is backscattered light having the flight distance Zs after propagation in the inside of the measurement object 2.

A processing device 420 of the measuring apparatus 400 includes a measurement counter 421 that counts the number of times of measurement. According to the count of the measurement counter 421, the distributor 122 stores data measured at the first time in the first storage unit 123a and stores data measured at the second time in the second storage unit 123b.

Figure 24:
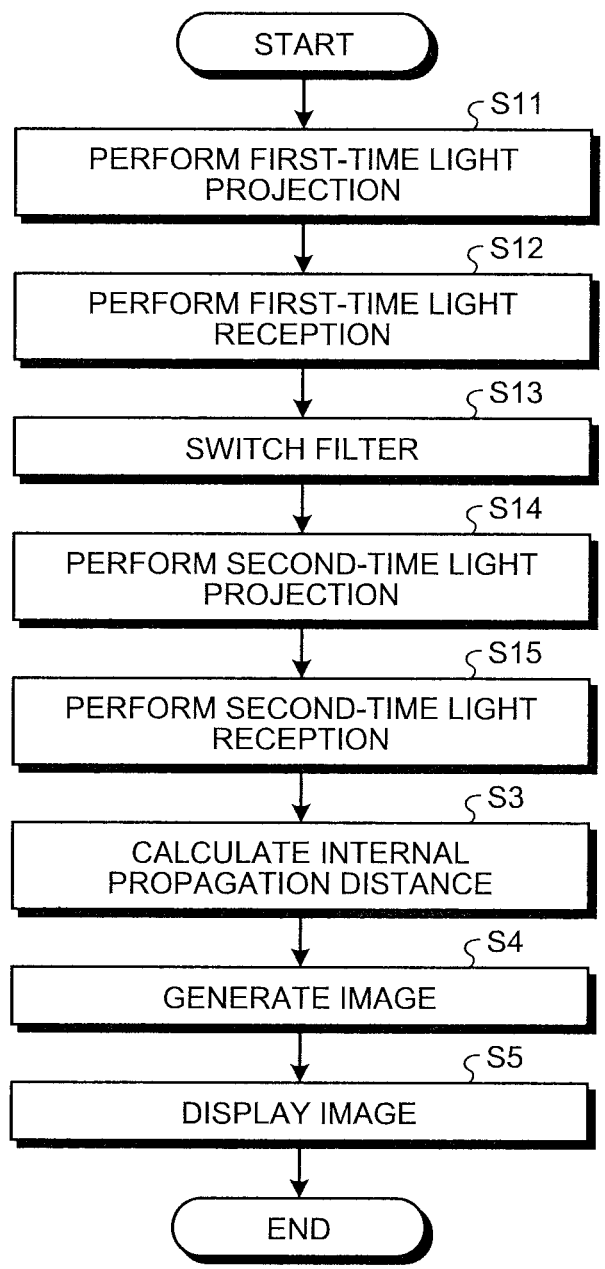
FIG. 24 is a flowchart illustrating an operation of measuring the measurement object by the measuring apparatus illustrated in FIG. 22.

FIG. 24 is a flowchart illustrating an operation of measuring the measurement object by the measuring apparatus illustrated in FIG. 22. As illustrated in FIG. 24, first, under the control of the control unit 21, the light source driving device 12 performs the first-time light projection from the light source 11 onto the measurement object 2 through the illumination lens 13 (Step S11).

At the same time, the photodetector 16 performs the first-time light reception (Step S12). In the first-time light reception, the filter switching unit 411 arranges the first wavelength filter 412 on the optical path of the light backscattered in the measurement object 2. Therefore, the photodetector 16 receives the light that is backscattered in the measurement object 2 and passes through the light receiving lens 14 and the first wavelength filter 412. The photodetector 16 converts the received optical signal into an electric signal. In addition, the electric signal is amplified by the amplifier 17, AD-converted by the AD converter 18, and output to the processing device 420. This signal is distributed by the distributor 122 in the processing device 420 to be stored in the first storage unit 123a.

Subsequently, the filter switching unit 411 switches the filter arranged on the optical path of the light backscattered in the measurement object 2 from the first wavelength filter 412 to the second wavelength filter 413 (Step S13).

After that, under the control of the control unit 21, the light source driving device 12 performs second-time light projection from the light source 11 onto the measurement object 2 through the illumination lens 13 (Step S14).

At the same time, the photodetector 16 performs the second-time light reception (Step S15). In the second-time light reception, the filter switching unit 411 arranges the second wavelength filter 413 on the optical path of the light backscattered in the measurement object 2. Therefore, the photodetector 16 receives light that is backscattered in the measurement object 2 and passes through the light receiving lens 14 and the second wavelength filter 413. The photodetector 16 converts the received optical signal into an electric signal. In addition, the electric signal is amplified by the amplifier 17, AD-converted by the AD converter 18, and output to the processing device 20. This signal is distributed by the distributor 122 in the processing device 20 to be stored in the second storage unit 123b.

Subsequently, the internal propagation distance calculation unit 26 calculates the internal propagation distance $\Delta Z$ according to the output of the depth camera 410 (Step S3). Specifically, the internal propagation distance calculation unit 26 calculates the reference distance Zo from the signal obtained in the first measurement and calculates the difference between the flight distance Zs of the signal obtained by the second measurement and the reference distance Zo to calculate the internal propagation distance $\Delta Z$.

After that, the same control as that in the first embodiment is performed, and an image corresponding to the optical characteristics of the measurement object 2 is displayed on the display unit 40.

As described above, according to the second embodiment, the light source device 10A and the light receiver 410B are arranged with respect to the measurement object 2 with an air layer interposed therebetween and are not in direct contact with the measurement object. In addition, since the filter switching unit 411, the first wavelength filter 412, and the second wavelength filter 413 are provided as the distance acquisition units and the reference distance Zo can be obtained by performing measurement by changing the wavelength of the light received by the light receiver 410B, the internal propagation distance $\Delta Z$ is calculated, so that it is possible to calculate the optical characteristics of the inside of the measurement object 2.

In addition, in the measuring apparatus 400, by setting the wavelength of the light passing through the second wavelength filter 413 to a longer wavelength, it is possible to measure a deeper portion of the measurement object 2. Therefore, by adjusting the wavelength of the light passing through the second wavelength filter 413, it is possible for a user to measure a desired depth.

Modified Example 2-1

Figure 25:
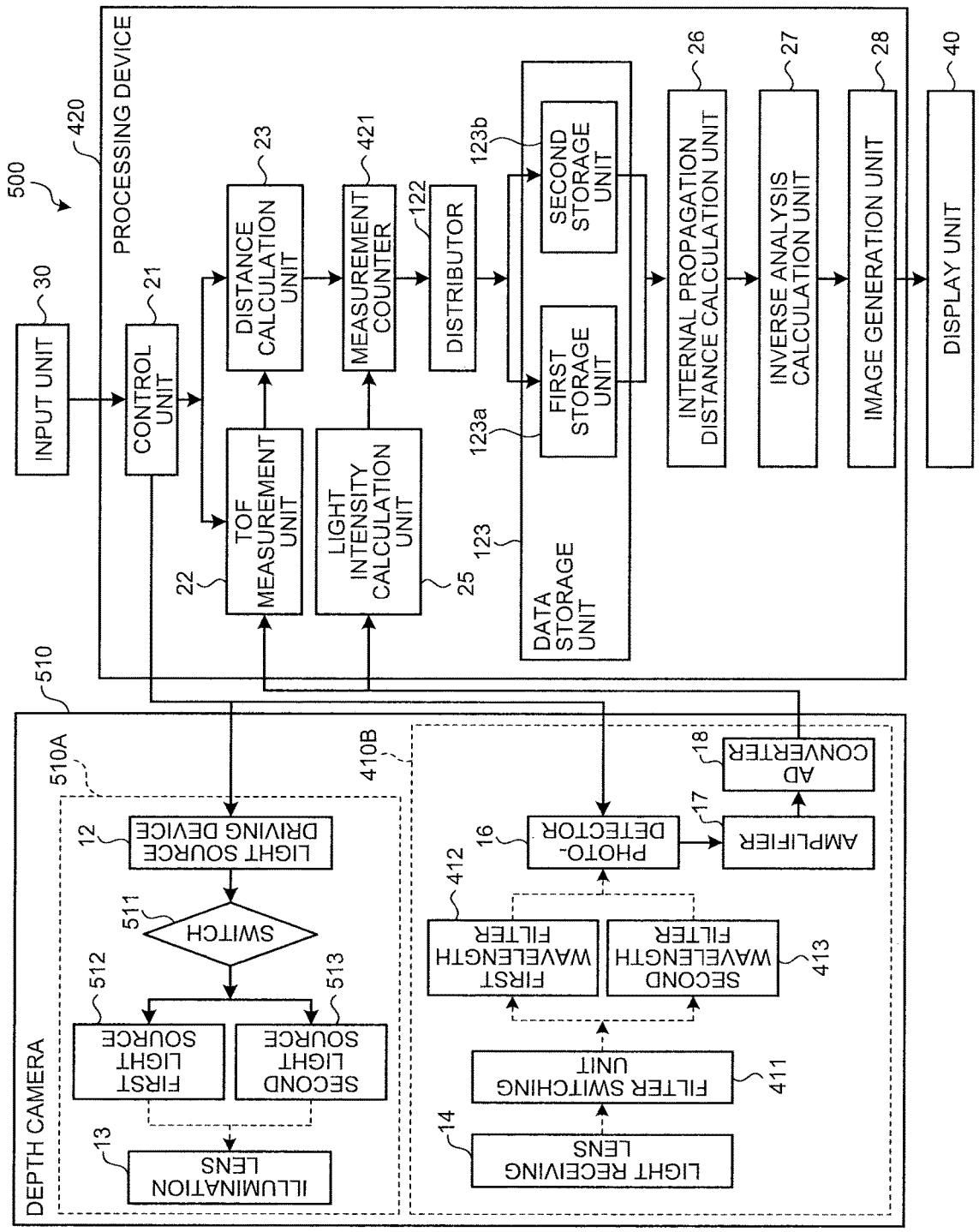
FIG. 25 is a schematic diagram illustrating a configuration of a measuring apparatus according to Modified Example 2-1 of the second embodiment.

FIG. 25 is a schematic diagram illustrating a configuration of a measuring apparatus according to Modified Example 2-1 of the second embodiment. As illustrated in FIG. 25, a light source device 510A of a depth camera 510 of a measuring apparatus 500 includes a switch 511 that switches a light source to be driven, a first light source 512 that projects light having a first wavelength, and a second light source 513 that projects light having a second wavelength.

In the measuring apparatus 500, measurement similar to that in the second embodiment can be performed by changing the wavelength of the light projected from the light source device 510A. In addition, the light receiver 410B may have a configuration where the light receiver does not include the filter switching unit 411, the first wavelength filter 412, and the second wavelength filter 413.

Modified Example 2-2

Figure 26:
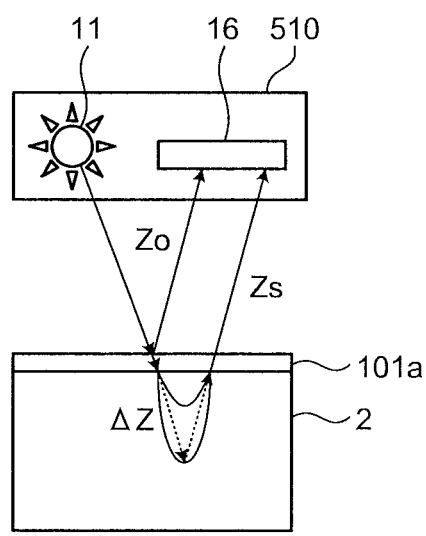
FIG. 26 is a diagram illustrating a state where a measurement object is measured by a measuring apparatus of Modified Example 2-2 of the second embodiment.

FIG. 26 is a diagram illustrating a state where a measurement object is measured by a measuring apparatus according to Modified Example 2-2 of the second embodiment. As illustrated in FIG. 26, in this measuring apparatus, a reference member 101a where light having an ultraviolet range is reflected and where light having a wavelength of 540 nm is transmitted is arranged on a surface of the measurement object 2. The position at which the reference member 101a is arranged may be the same as that in Modified Example 1-1 of the first embodiment.

With this configuration, the reference distance Zo is calculated from the light having an ultraviolet range, and the optical characteristics of the inside of the measurement object 2 is calculated from the light having a wavelength of 540 nm. Therefore, similarly to Modified Example 1-1 of the first embodiment, it is possible to measure the optical characteristics of the inside of the measurement object 2 by one-time measurement. However, the reference distance Zo may be measured by arranging the reference members 101a so as to cover the surface of the measurement object 2, and after that, the flight distance Zs may be measured by removing the reference members 101a.

Third Embodiment

Figure 27:
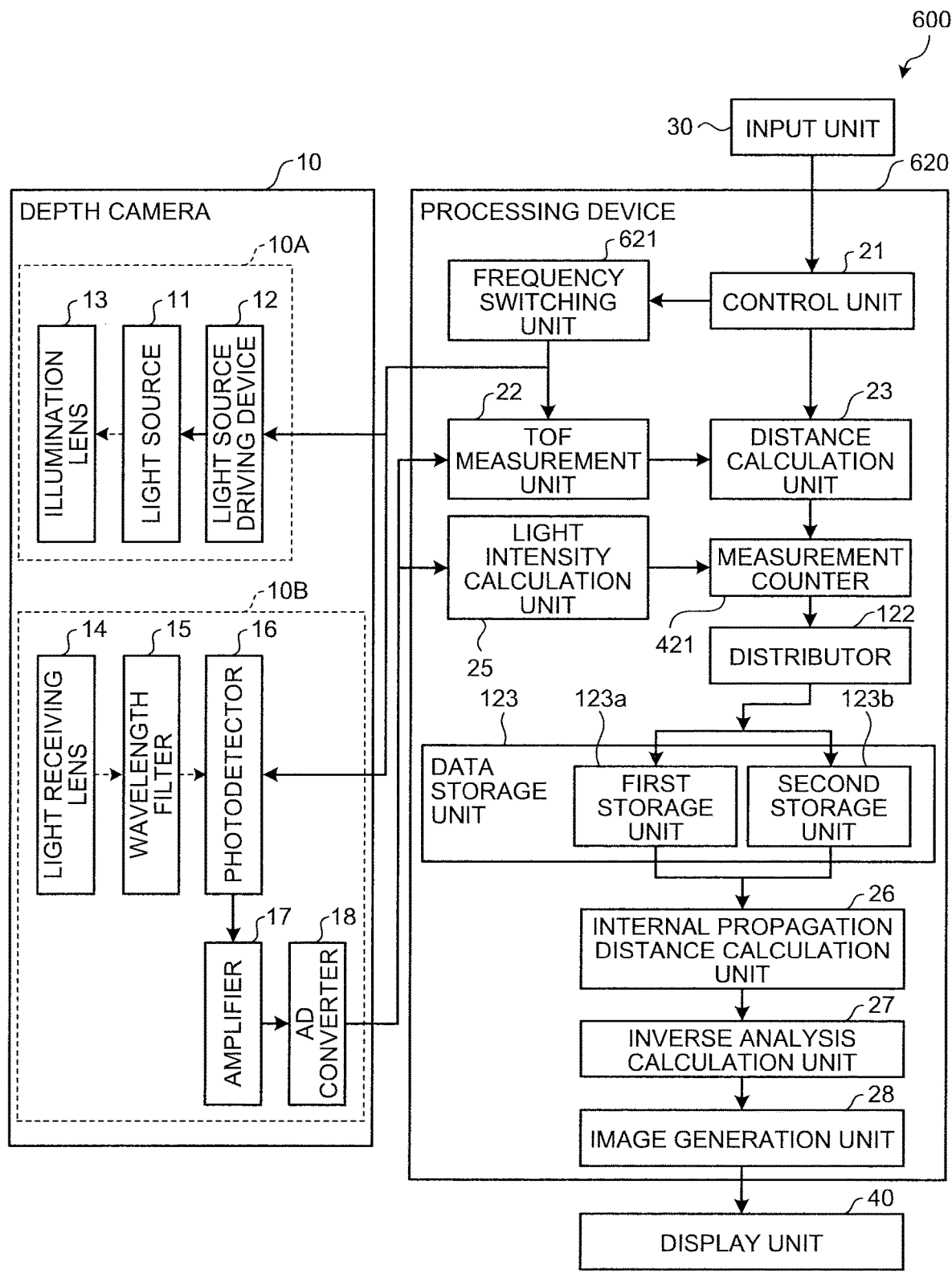
FIG. 27 is a schematic diagram illustrating a configuration of a measuring apparatus according to a third embodiment.

FIG. 27 is a schematic diagram illustrating a configuration of a measuring apparatus according to a third embodiment. As illustrated in FIG. 27, a processing device 620 of a measuring apparatus 600 includes a frequency switching unit 621 that switches a frequency of intensity modulation of light projected by the light source 11.

The frequency switching unit 621 switches the frequency of the intensity modulation to, for example, 30 MHz and 3 GHz. When a phase shift in the case of performing measurement with a modulation frequency of 30 MHz is denoted by $\phi 1$ and a phase shift in the case of performing measurement with a modulation frequency of 3 GHz is denoted by $\phi 2$, when the measurement object 2 is the same, a relationship of $\phi 2 = 100 \times \phi 1$ is established. That is, since the phase shift $\phi 1$ is sufficiently smaller than the phase shift $\phi 2$, the distance calculated from the phase shift $\phi 1$ can be regarded approximately as the reference distance Zo. Then, the distance calculated from the phase shift $\phi 2$ is set as the flight distance Zs, and the internal propagation distance $\Delta Z$ can be calculated from the difference.

As described above, according to the third embodiment, the light source device 10A and the light receiver 10B are arranged with respect to the measurement object 2 with an air layer interposed therebetween and are not in direct contact with the measurement object. In addition, since the reference distance Zo can be obtained by performing measurement after changing the frequency of the intensity modulation of the light projected by the light source device 10A by the frequency switching unit 621 as the distance acquisition unit, the internal propagation distance $\Delta Z$ is calculated, so that it is possible to calculate the optical characteristics of the inside of the measurement object 2.

Fourth Embodiment

Figure 28:
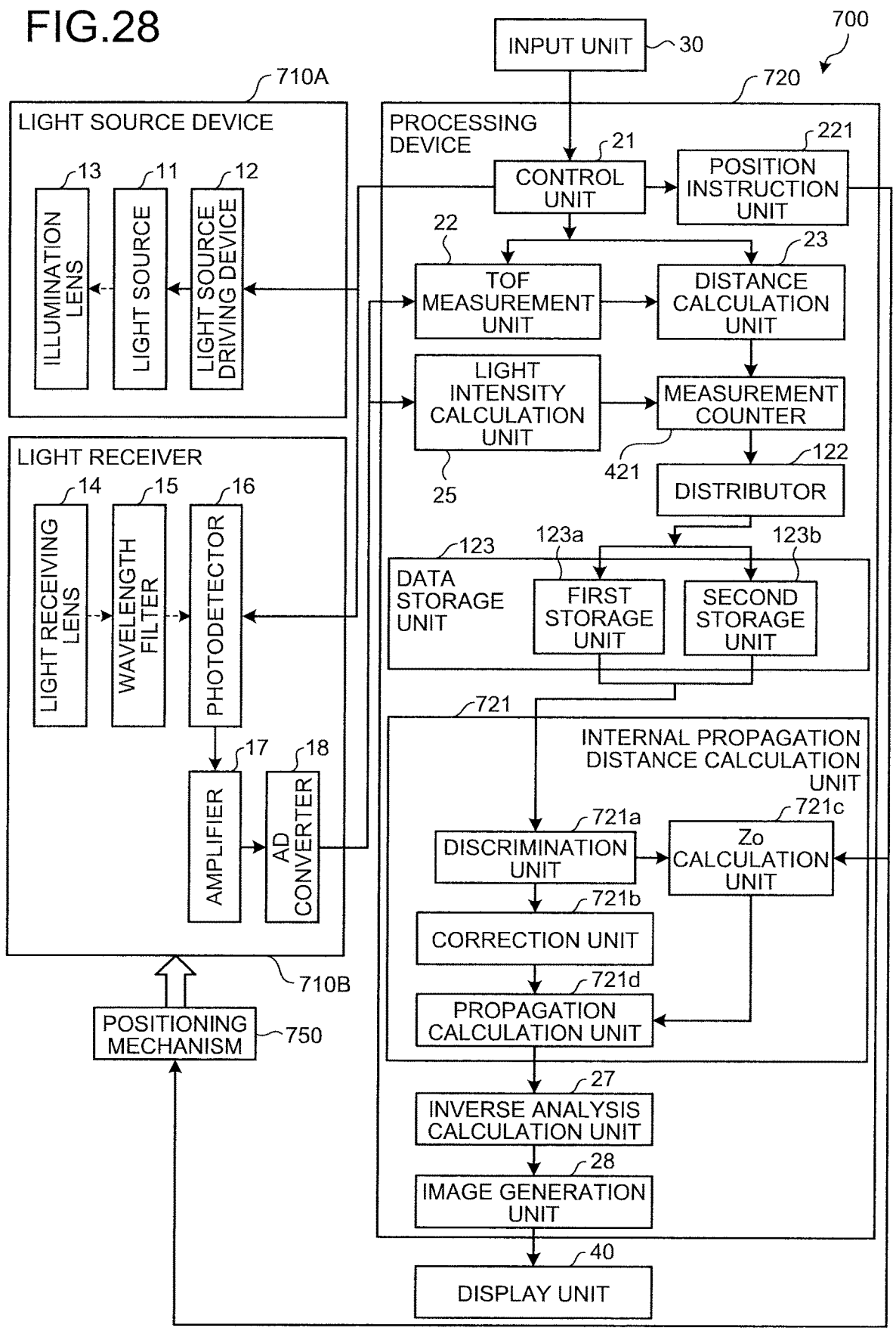
FIG. 28 is a schematic diagram illustrating a configuration of a measuring apparatus according to a fourth embodiment.

FIG. 28 is a schematic diagram illustrating a configuration of a measuring apparatus according to a fourth embodiment. As illustrated in FIG. 28, a measuring apparatus 700 is configured such that a light source device 710A and a light receiver 710B are divided, and the light receiver 710B is configured to be movable by a positioning mechanism 750 as a moving device.

In a processing device 720 of the measuring apparatus 700, an internal propagation distance calculation unit 721 includes a discrimination unit 721a that discriminates pixels indicating a predetermined abnormal value, a correction unit 721b that corrects measurement data, a Zo calculation unit 721c that calculates a reference distance Zo, and a propagation calculation unit 721d that calculates an internal propagation distance $\Delta Z$.

Figure 29:
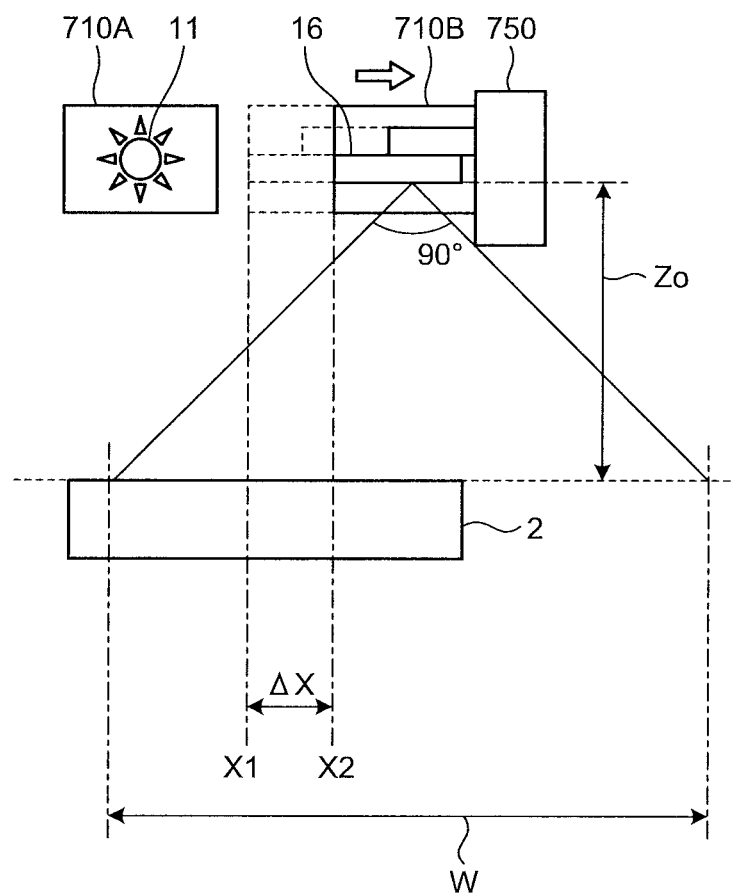
FIG. 29 is a diagram illustrating a state where a measurement object is measured by the measuring apparatus illustrated in FIG. 28.
Figure 30:
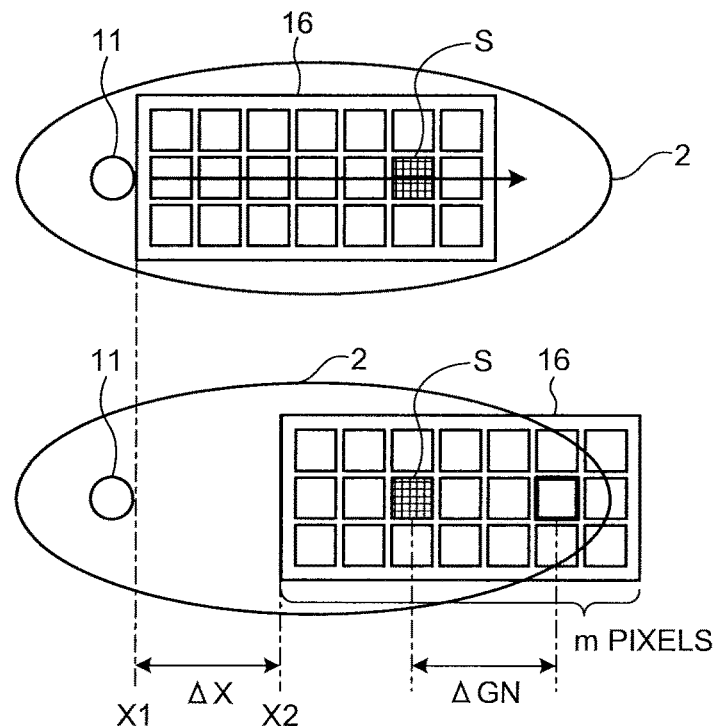
FIG. 30 is a diagram illustrating a state where a measurement object is measured by the measuring apparatus illustrated in FIG. 28.

FIGS. 29 and 30 are diagrams illustrating a state where the measurement object is measured by the measuring apparatus illustrated in FIG. 28. In the measuring apparatus 700, as illustrated in FIG. 29, the light receiver 710B is arranged at a position X1 to perform the first-time measurement, and the light receiver 710B is moved by the movement amount $\Delta X$ by the positioning mechanism 750 to be arranged at a position X2 to perform the second-time measurement. The measurement range W of the light receiver 710B is W=2Zo in a case where the light receiving lens 14 having an opening angle of 90° on both sides is used.

The first measurement data is stored in the first storage unit 123a of the data storage unit 123, and the second measurement data is stored in the second storage unit 123b.

The discrimination unit 721a discriminates pixels indicating predetermined abnormal values from the first measurement data and the second measurement data stored in the data storage unit 123. As illustrated in FIG. 30, when measurement is performed by using the measuring apparatus 700, in some cases, the flight distance Zs and the light intensity A for the pixel S corresponding to a specific position of the light receiver 710B may be greatly different from those of the peripheral pixels. The discrimination unit 721a discriminates the pixel S indicating the abnormal values.

The correction unit 721b corrects the flight distance Zs and the light intensity A for the pixel S indicating the abnormal values by using the flight distance Zs and the light intensity A for the peripheral pixels.

The Zo calculation unit 721c calculates the reference distance Zo from the movement of the pixel S indicating the abnormal value. First, the position of the pixel S on the measurement object 2 is not changed even if the light receiver 710B is moved. At this time, when the light receiver 710B is moved by the movement amount $\Delta X$, the pixel S indicating the abnormal value is moved within the light receiver 710B by the number of pixels $\Delta GN$. In addition, the total number of pixels arranged in the moving direction is denoted by m. Since $\Delta X/W$ which is the ratio of the moved distances and $\Delta GN/m$ which is the ratio of the moved pixels can be approximated, the following equation (9) is satisfied.

$$\frac{\Delta X}{W} = \frac{\Delta GN}{m} \tag{9}$$

Herein, when W=2Zo is inserted and the equation is rearranged, the following equation (10) is calculated.

$$Zo = \frac{m\Delta X}{2\Delta GN} \quad (10)$$

The Zo calculation unit 721c acquires the movement amount ΔX from the position instruction unit 221 and acquires the number of pixels ΔGN from the measurement data and calculates the reference distance Zo by inserting the movement amount and the number of pixels into the equation (10).

The propagation calculation unit 721d calculates the internal propagation distance ΔZ by using the corrected measurement data output from the correction unit 721b and the reference distance Zo calculated by the Zo calculation unit 721c. The propagation calculation unit 721d may calculate the internal propagation distance ΔZ from either the first measurement data or the second measurement data or may calculate the internal propagation distance ΔZ from the average value of the first measurement data and the second measurement data.

As described above, according to the fourth embodiment, the light source device 710A and the light receiver 710B are arranged with respect to the measurement object 2 with an air layer interposed therebetween and are not in direct contact with the measurement object. In addition, since the reference distance Zo can be obtained by performing measurement at the positions before and after moving the light receiver 710B as the distance acquisition unit, the internal propagation distance ΔZ is calculated, and thus, it is possible to calculate the optical characteristics of the inside of the measurement object 2.

Modified Example 4-1

Figure 31:
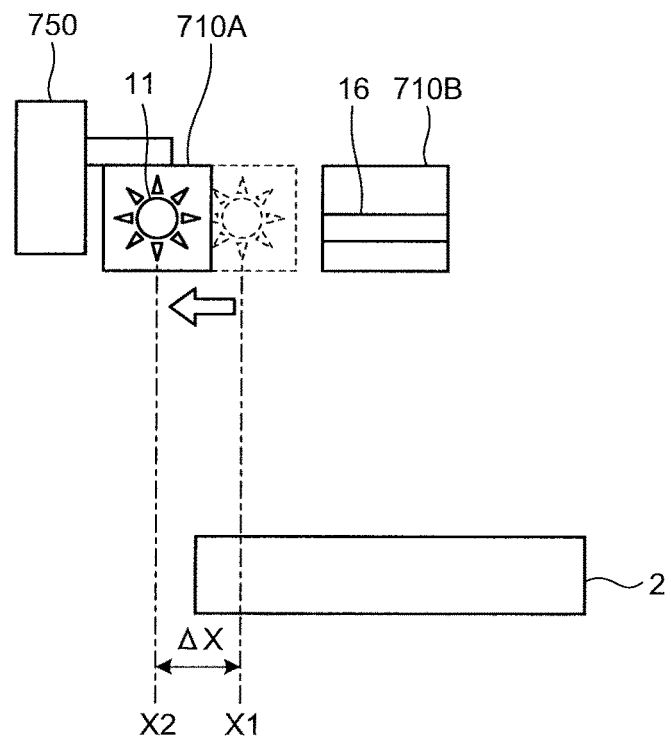
FIG. 31 is a diagram illustrating a state where a measurement object is measured by a measuring apparatus according to Modified Example 4-1 of the fourth embodiment.

FIG. 31 is a diagram illustrating a state where a measurement object is measured by a measuring apparatus according to Modified Example 4-1 of the fourth embodiment. As illustrated in FIG. 31, in this measuring apparatus, similarly to the fourth embodiment, the reference distance Zo is calculated by moving the light source device 710A and performing measurement In addition, in the fourth embodiment and Modified Example 4-1, the reference distance Zo is calculated by moving the light source device 710A or the light receiver 710B in the horizontal direction, but the disclosure is not limited thereto. For example, the reference distance Zo may be calculated by moving the light source device 710A or the light receiver 710B in the vertical direction.

In addition, in the fourth embodiment and Modified Example 4-1, the configuration where the light source device 710A or the light receiver 710B is moved has been described, but the disclosure is not limited thereto. A plurality of the light source devices 710A or the light receivers 710B may be arranged at different positions, and the reference distance Zo may be calculated by switching the light source devices 710A or the light receivers 710B to be sequentially operated.

Figure 32:
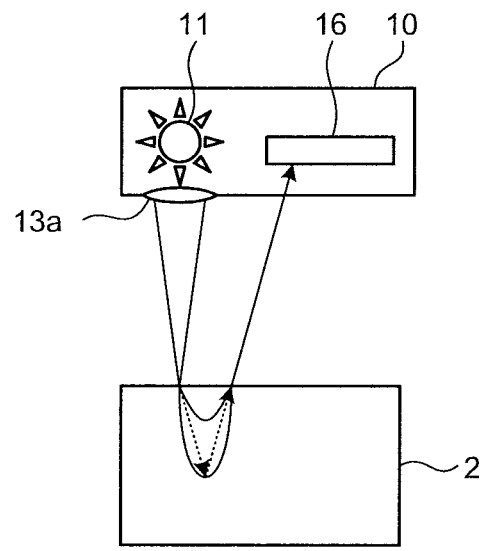
FIG. 32 is a schematic configuration diagram of a measuring apparatus in a case where the illumination lens is a condenser lens.
Figure 33:
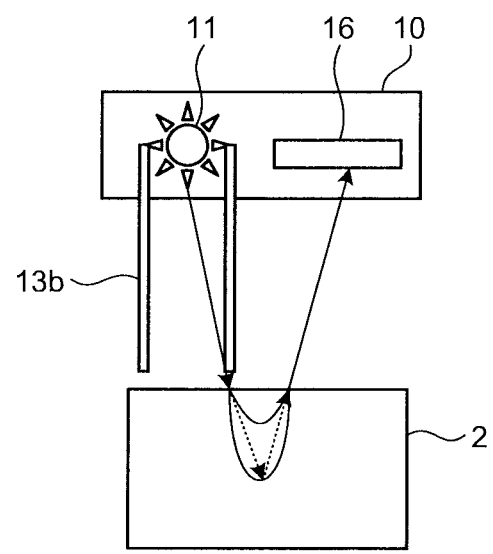
FIG. 33 is a schematic configuration diagram of a measuring apparatus including a light guide instead of an illumination lens.

In addition, in the embodiment described above, the illumination lens 13 is described as a diffusion lens, but the disclosure is not limited thereto. FIG. 32 is a schematic configuration diagram of a measuring apparatus in a case where the illumination lens is a condenser lens. As illustrated in FIG. 32, a condenser lens 13a may be used as the illumination lens. FIG. 33 is a schematic configuration diagram of a measuring apparatus including a light guide instead of the illumination lens. As illustrated in FIG. 33, a light guide 13b that guides the light projected from the light source 11 may be used instead of the illumination lens. The light guide 13b may be a tube of which inside has a mirror surface or an optical fiber.

In addition, in the embodiment described above, the configuration where the TOF measurement unit 22 calculates the phase shift of the intensity modulation between the light projected from the light source 11 and the light received by the photodetector 16 as the TOF information has been described, the disclosure is not limited thereto. For example, in a case where the light projected from the light source 11 is pulsed light, the TOF measurement unit 22 measures a time delay from the time when the pulsed light is projected from the light source 11 to the time when the light returning from the measurement object 2 is received as the TOF information. Then, the distance calculation unit 23 calculates the flight distance Zs from the time delay measured by the TOF measurement unit 22.

According to some embodiments, it is possible to realize a measuring apparatus and a measuring method capable of measuring a measurement object by using TOF measurement without bringing a light source device and a light receiver into contact with the measurement object.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A measuring apparatus comprising:
    a light source arranged with respect to a measurement object with a gas layer or a vacuum layer interposed between the light source and the measurement object and configured to project pulsed light or light of which intensity is periodically modulated onto the measurement object;
    a light receiver arranged with respect to the measurement object with the gas layer or the vacuum layer interposed between the light source and the measurement object and configured to receive backscattered light of light projected by the light source from the measurement object; and
    a processor comprising hardware, the processor being configured to:
        measure time of flight (TOF) information of the light projected by the light source and the backscattered light received by the light receiver;
        acquire a reference distance from a surface of the measurement object to the light source and the light receiver;
        calculate a difference between the measured TOF information and the acquired reference distance; and
        calculate an internal propagation distance in the measurement object according to the calculated difference between the measured TOF information and the acquired reference distance.

2. The measuring apparatus according to claim 1, wherein the processor is further configured to:
    calculate light intensity of the light received by the light receiver; and calculate optical characteristics of the measurement object according to the calculated light intensity and the calculated internal propagation distance.

3. The measuring apparatus according to claim 2, wherein the processor is further configured to calculate the optical characteristics of the measurement object by inverse analysis.

4. The measuring apparatus according to claim 2, wherein the optical characteristic calculated by the processor comprises at least one of a scattering coefficient, an absorption coefficient, and an anisotropic parameter.

5. The measuring apparatus according to claim 2, wherein the processor is further configured to generate an image based on the calculated optical characteristics.

6. The measuring apparatus according to claim 1, wherein the reference distance is fixed.

7. The measuring apparatus according to claim 1, further comprising at least one reference member arranged between the measurement object and the gas layer or the vacuum layer,
wherein the processor is configured to acquire distances from the at least one reference member to the light source and the light receiver, respectively.

8. The measuring apparatus according to claim 7, wherein the at least one reference member is arranged in a portion of a region where the light receiver receives the light.

9. The measuring apparatus according to claim 8, wherein the at least one reference member comprises a plurality of reference members.

10. The measuring apparatus according to claim 7, wherein the at least one reference member is arranged on a transparent member.

11. The measuring apparatus according to claim 1, further comprising:
wherein the processor is configured to calculate the reference distance from a length of an object brought into contact with the measurement object and a position of the object with respect to a surface of the measurement object.

12. The measuring apparatus according to claim 11, further comprising a contact sensor arranged at a distal end of the object and configured to detect whether the distal end of the object is in contact with the surface of the measurement object.

13. The measuring apparatus according to claim 1,
wherein the light source is configured to project light onto the measurement object, and
wherein the measuring apparatus further comprises an optical element configured to transmit light so that the light projected from the light source onto the measurement object forms an illuminance distribution where bright portions and dark portions are periodically repeated spatially.

14. The measuring apparatus according to claim 13,
wherein the light receiver is configured to receive a plurality of rays of the backscattered light having different illuminance distributions, and
wherein the processor is configured to calculate the internal propagation distance by using a measurement result of the dark portion of the plurality of rays of the backscattered light received by the light receiver.

15. The measuring apparatus according to claim 14, wherein the processor is configured to calculate the reference distance by using measurement results of the bright portion and the dark portion of the plurality of rays of the backscattered light received by the light receiver.

16. The measuring apparatus according to claim 14,
wherein the processor is configured to:
calculate the reference distance by using measurement results of the bright portion and the dark portion of two or more rays of backscattered light among the plurality of rays of the backscattered light received by the light receiver; and
calculate the internal propagation distance by using measurement results of the dark portions of two or more rays of backscattered light among the plurality of rays of the backscattered light received by the light receiver.

17. The measuring apparatus according to claim 14, wherein the illuminance distribution is changed by moving a position of the optical element.

18. The measuring apparatus according to claim 14, wherein the illuminance distribution is changed by moving a position of the light source.

19. The measuring apparatus according to claim 13, wherein the optical element comprises a pattern filter configured to selectively transmit light.

20. The measuring apparatus according to claim 13, wherein the optical element comprises a polarizer configured to selectively transmit light having a predetermined polarization.

21. The measuring apparatus according to claim 1, wherein the light receiver comprises a plurality of wavelength filters configured to transmit only light having a plurality of different predetermined wavelength bands, respectively, and the light receiver is configured to receive light having each of the predetermined wavelength bands.

22. The measuring apparatus according to claim 1, comprising a plurality of the light source configured to:
project light having a plurality of different predetermined wavelength bands, respectively; and
project light having each of the predetermined wavelength bands.

23. The measuring apparatus according to claim 1, wherein the light source is configured to:
project light having a plurality of different modulation frequencies, respectively; and
project light at each of the modulation frequencies.

24. The measuring apparatus according to claim 1,
wherein the light source and the light receiver are configured to perform light projection and light reception before and after the light source or the light receiver is moved.

25. The measuring apparatus according to claim 1, wherein the light receiver comprises a wavelength filter configured to transmit only light having a predetermined wavelength band.

26. The measuring apparatus according to claim 1,
wherein the light source is configured to project light onto the measurement object, and
wherein the measuring apparatus further comprises a diffusion lens configured to diffuse the light projected from the light source.

27. The measuring apparatus according to claim 1, wherein the light source is configured to project light onto the measurement object and a condenser lens configured to condense the light projected from the light source.

28. The measuring apparatus according to claim 1, wherein the light source is configured to project light onto the measurement object and a light guide configured to guide the light projected from the light source so as to limit a range of the measurement object which the light is to be projected onto.

29. A measuring method using a measuring apparatus in which a light source and a light receiver are arranged with respect to a measurement object with a gas layer or a vacuum layer interposed between the light source and the measurement object and which projects pulsed light or light of which intensity is periodically modulated onto the measurement object and receives backscattered light of light projected by the light source from the measurement object, the measuring method comprising:
- measuring time of flight (TOF) information of the light projected by the light source and the backscattered light received by the light receiver;
- acquiring a reference distance, based on the TOF information, from a surface of the measurement object and an inside of the measurement object to the light source and the light receiver, respectively;
- calculating a difference between the measured TOF information and the acquired reference distance; and
- calculating an internal propagation distance in the measurement object based on the calculated difference between the measured TOF information and the acquired distances.

30. The measuring method according to claim 29, further comprising:
- calculating light intensity of light received by the light receiver; and
- calculating optical characteristics of the measurement object according to the calculated light intensity and the calculated internal propagation distance.

31. The measuring method according to claim 30, further comprising calculating the optical characteristics of the measurement object by inverse analysis.

32. The measuring method according to claim 30, further comprising generating an image based on the calculated optical characteristics.

33. The measuring method according to claim 29, wherein light projection by the light source and light reception by the light receiver are performed a plurality of times.

* * * * *